United States Patent
Hu et al.

(10) Patent No.: US 11,719,996 B2
(45) Date of Patent: Aug. 8, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Chen-Hsien Fan, Taoyuan (TW); Chih-Wen Chiang, Taoyuan (TW); Chia-Che Wu, Taoyuan (TW); Yu-Chiao Lo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 263 days.

(21) Appl. No.: 16/950,263

(22) Filed: Nov. 17, 2020

(65) Prior Publication Data
US 2021/0397067 A1 Dec. 23, 2021

Related U.S. Application Data

(60) Provisional application No. 63/065,865, filed on Aug. 14, 2020, provisional application No. 63/041,459, filed on Jun. 19, 2020.

(30) Foreign Application Priority Data

Oct. 9, 2020 (CN) .......................... 202022232527.0

(51) Int. Cl.
*G03B 5/02* (2021.01)
*G02B 7/28* (2021.01)
*G02B 7/36* (2021.01)

(52) U.S. Cl.
CPC .............. *G03B 5/02* (2013.01); *G02B 7/285* (2013.01); *G02B 7/36* (2013.01); *G03B 2205/0069* (2013.01)

(58) Field of Classification Search
CPC ........ G02B 27/646; G02B 7/08; G02B 7/285; G02B 7/36; G03B 2205/0069; G03B 3/10; G03B 5/02; H04N 5/2254
See application file for complete search history.

(56) References Cited

U.S. PATENT DOCUMENTS

2013/0077184 A1* 3/2013 Osaka ................ H02K 41/0356
359/824

FOREIGN PATENT DOCUMENTS

CN 211698336 U 10/2020

OTHER PUBLICATIONS

Office Action dated Mar. 31, 2021 in Chinese Application No. 202022232527.0, 1 page.

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, a driving assembly, and a support assembly. The movable portion is used for connecting to an optical element. The movable portion may move relative to the fixed portion. The driving assembly is used for driving the movable portion to move relative to the fixed portion. The movable portion is movable relative to the fixed portion through the support assembly.

20 Claims, 34 Drawing Sheets

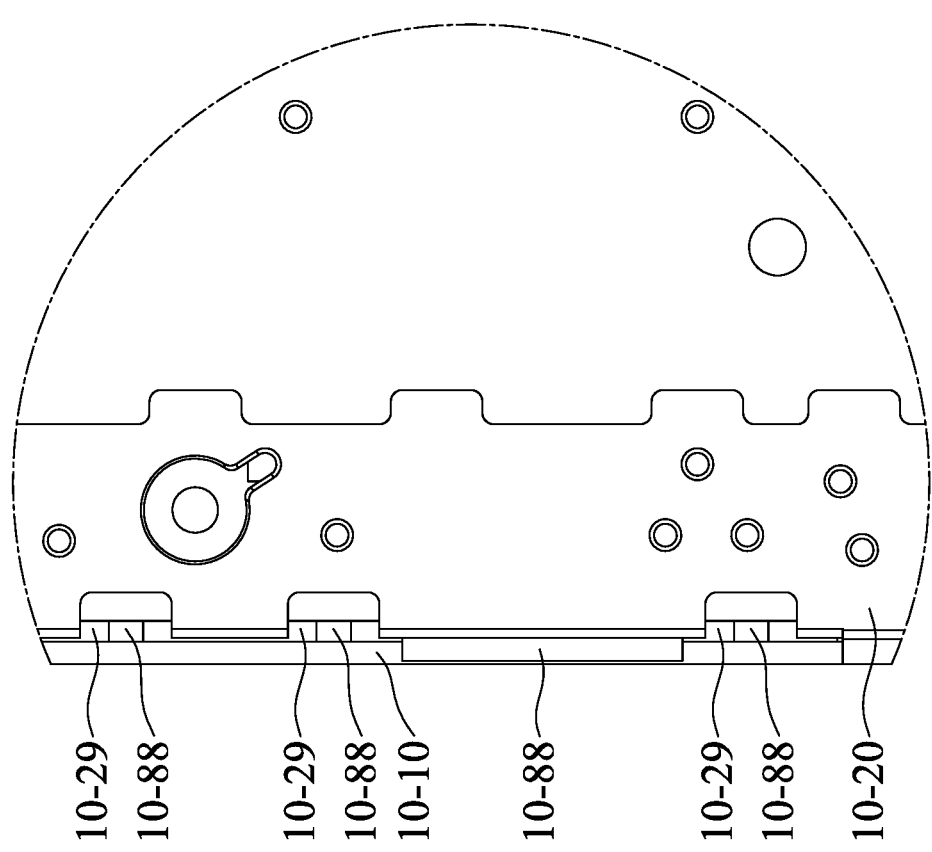

OPTICAL ELEMENT DRIVING MECHANISM

CROSS REFERENCE TO RELATED APPLICATIONS

This application claims the benefit of U.S. Provisional Application No. 63/041,459, filed on Jun. 19, 2020, and 63/065,865, filed on Aug. 14, 2020 and China Patent Application No. 202022232527.0 filed on Oct. 9, 2020, the entireties of which are incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided. The optical element driving mechanism includes a movable portion, a fixed portion, a driving assembly, and a support assembly. The movable portion is used for connecting to an optical element. The movable portion may move relative to the fixed portion. The driving assembly is used for driving the movable portion to move relative to the fixed portion. The movable portion is movable relative to the fixed portion through the support assembly.

In some embodiments, the support assembly includes a resilient element, the movable portion is movably connected to the fixed portion through the resilient element and moves relative to the fixed portion in a movable range. The resilient element is plate-shaped. The driving assembly includes a coil and a magnetic element. The movable portion includes a first stopping structure used for limiting the movable portion to move relative to the fixed portion in a movable range, and a second stopping structure used for limiting the movable portion to move relative to the fixed portion in the movable range. The first stopping structure extends in a first direction. The second stopping structure extends in the first direction. The first stopping structure has a first stopping surface facing the fixed portion. The second stopping structure has a second stopping surface facing the fixed portion. The first stopping surface and the second stopping surface are parallel to each other. The minimum distance between the first stopping surface and the fixed portion is different than the minimum distance between the second stopping surface and the fixed portion.

In some embodiments, wherein the movable portion further includes a coil surface facing the coil, a guiding wire accommodating structure recessed from the coil surface, and used for accommodating the guiding wire of the coil, a coil supporting structure protruding from the coil surface and corresponding to the coil, a resilient element limiting structure having a protruding shape, used for defining the movable range of the resilient element, and a lightening structure positioned at the second stopping surface, used for reducing the weight of the movable portion. The minimum distance between the first stopping surface and the fixed portion is greater than the minimum distance between the second stopping surface and the fixed portion. The first lightening structure has a recessed shape. The coil is affixed to the first stopping structure. The minimum distance between the first stopping surface and the fixed portion is less than the minimum distance between the coil and the fixed portion. The first stopping portion protrudes from the coil surface. The magnetic element at least overlaps a portion of the first stopping surface in the first direction. The resilient element at least overlaps a portion of the resilient element limiting structure when viewed along the optical axis. When the movable portion is positioned in the movable range, the resilient element limiting structure is not in contact with the fixed portion.

In some embodiments, the fixed portion includes a case including a top wall and side walls extending from sides of the top wall, a bottom arranged with the case along a main axis, and a reinforcement element includes polymer, and in direct contact with the strengthening element. The bottom includes a bottom plate, a wall, and a strengthening element. The bottom plate is plate-shaped. The wall is plate-shaped, and is not parallel to the bottom plate. At least a portion of the strengthening element is embedded in the bottom plate or the wall. The Young's modulus of the bottom plate is different than the Young's modulus of the wall. The strengthening element and the case include metal. At least a portion of the strengthening element is affixed to the case.

In some embodiments, the Young's modulus of the bottom plate is higher than the Young's modulus of the wall. At least a portion of the strengthening element includes identical material to the case. The reinforcement element is in direct contact with the bottom. The bottom includes a bottom surface facing away from the case. The bottom surface is perpendicular to the main axis. The bottom surface is parallel to the optical axis. The maximum distance between the bottom surface and the top wall is higher than the minimum distance between the reinforcement element and the top wall.

In some embodiments, the optical element driving mechanism further includes an electronic assembly disposed in a first accommodating space of the bottom plate, and a frame arranged with the movable portion along the optical axis. The movable portion further includes a second accommodating space having a recessed shape and corresponding to the first accommodating space. The first accommodating space overlaps the entire second accommodating space along the main axis, and the second accommodating space does not extend beyond the first accommodating space. The frame includes a first frame surface and a second frame surface facing the case, wherein the first frame surface and the second frame surface are facing different directions. The first frame surface and the second frame surface are not parallel to the optical axis.

In some embodiments, when the movable portion is in the movable range, the first accommodating space overlaps the entire second accommodating space along the main axis. The first frame surface and the second frame surface are facing opposite directions. The first frame surface and the second frame surface are perpendicular to the optical axis. The first frame surface faces the side wall. The second frame surface faces the top wall. The minimum distance between the first frame surface and the side wall is different than the minimum distance between the second frame surface and the top wall. The first frame surface at least overlaps a portion of the side wall along the optical axis. The second frame surface at least overlaps a portion of the top wall along the optical axis.

In some embodiments, the frame further includes a third frame surface facing the movable portion and perpendicular to the optical axis, a first frame side that extends in the first direction, a second frame side that extends in a second direction, and a second lightening structure disposed at the second frame side and having a recessed shape, used for reducing the weight of the frame. The third frame surface at least overlaps a portion of the movable portion when viewed along the optical axis. The first frame surface and the third frame surface are facing different directions. The frame has a polygonal shape when viewed along the optical axis. The width of the first frame side is less than the width of the second frame side. The first direction and the second direction are not parallel. The first direction and the second direction are perpendicular to the optical axis.

In some embodiments, the frame further includes a first noise-cancelling surface, a second noise-cancelling surface that is not parallel to the first noise-cancelling surface, a first low reflective material disposed on the first noise-cancelling surface, and a second reflective material disposed on the second noise-cancelling surface. The first noise-cancelling surface and the second noise-cancelling surface are arranged along the optical axis. The first noise-cancelling surface is neither parallel nor perpendicular to the optical axis. The second noise-cancelling surface is neither parallel nor perpendicular to the optical axis. The roughness of the first noise-cancelling surface is different than the roughness of the third frame surface. The roughness of the second noise-cancelling surface is different than the roughness of the third frame surface. The first frame surface and the third frame surface are facing opposite directions.

In some embodiments, the roughness of the first noise-cancelling surface is higher than the roughness of the third frame surface. The roughness of the second noise-cancelling surface is higher than the roughness of the third frame surface. The reflectivity of the first low reflective material is less than the reflectivity of the third frame surface. The reflectivity of the second low reflective material is less than the reflectivity of the third frame surface.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3C is an enlarged view of FIG. 3B.

DETAILED DESCRIPTION OF DISCLOSURE

Figure 1:
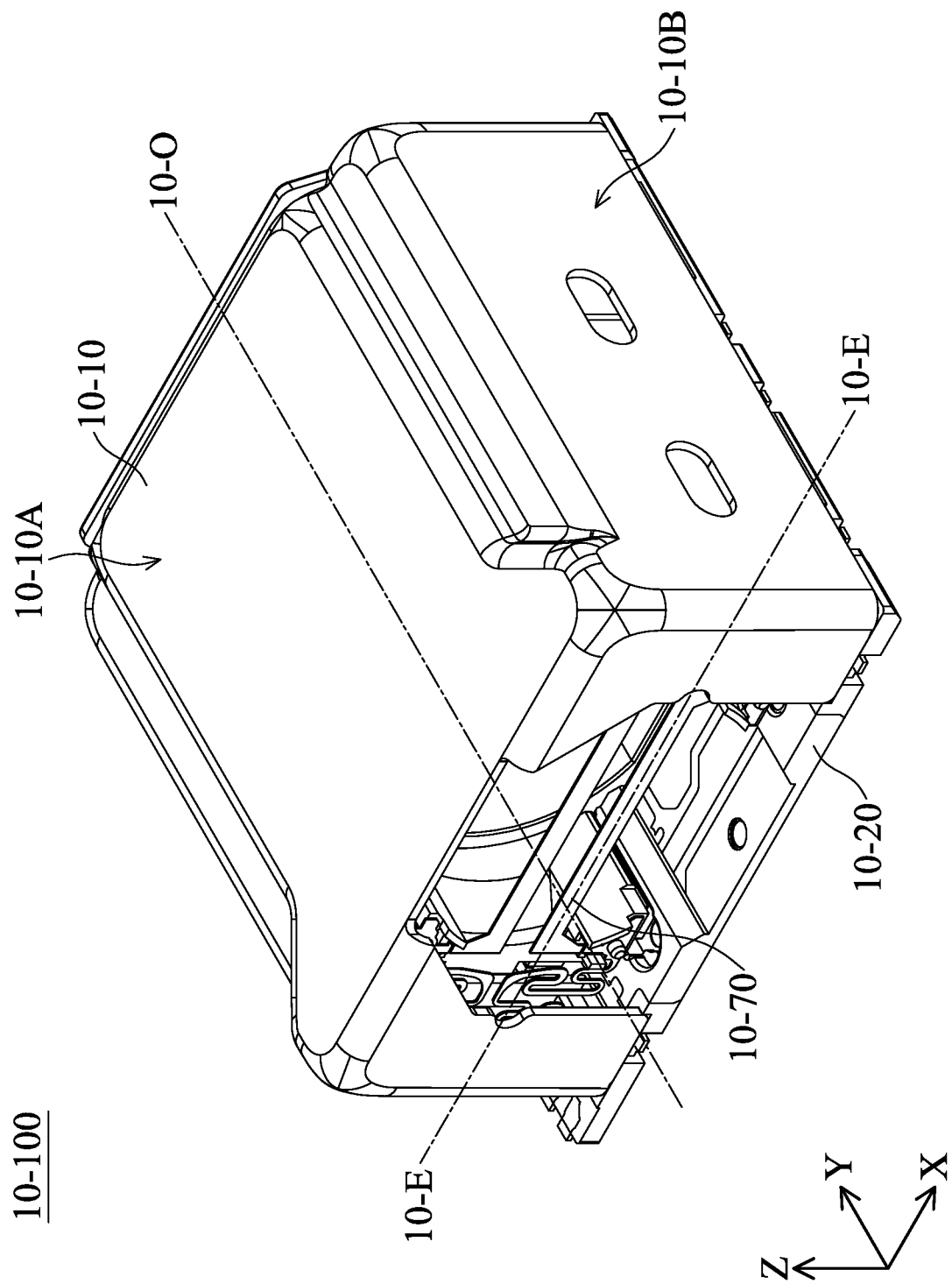
FIG. 1 is a perspective view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
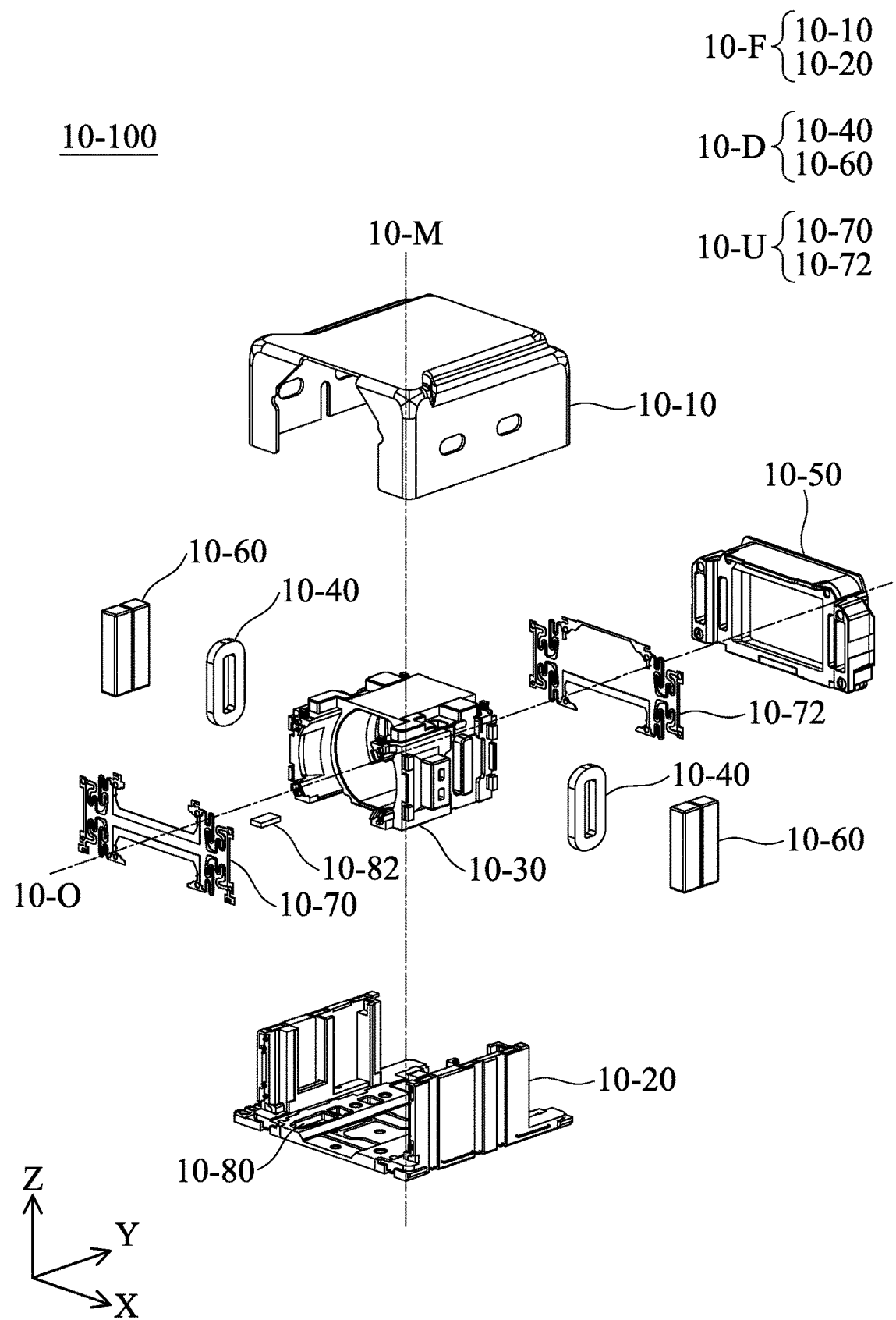
FIG. 2 is an exploded view of the optical element driving mechanism.
Figure 3A:
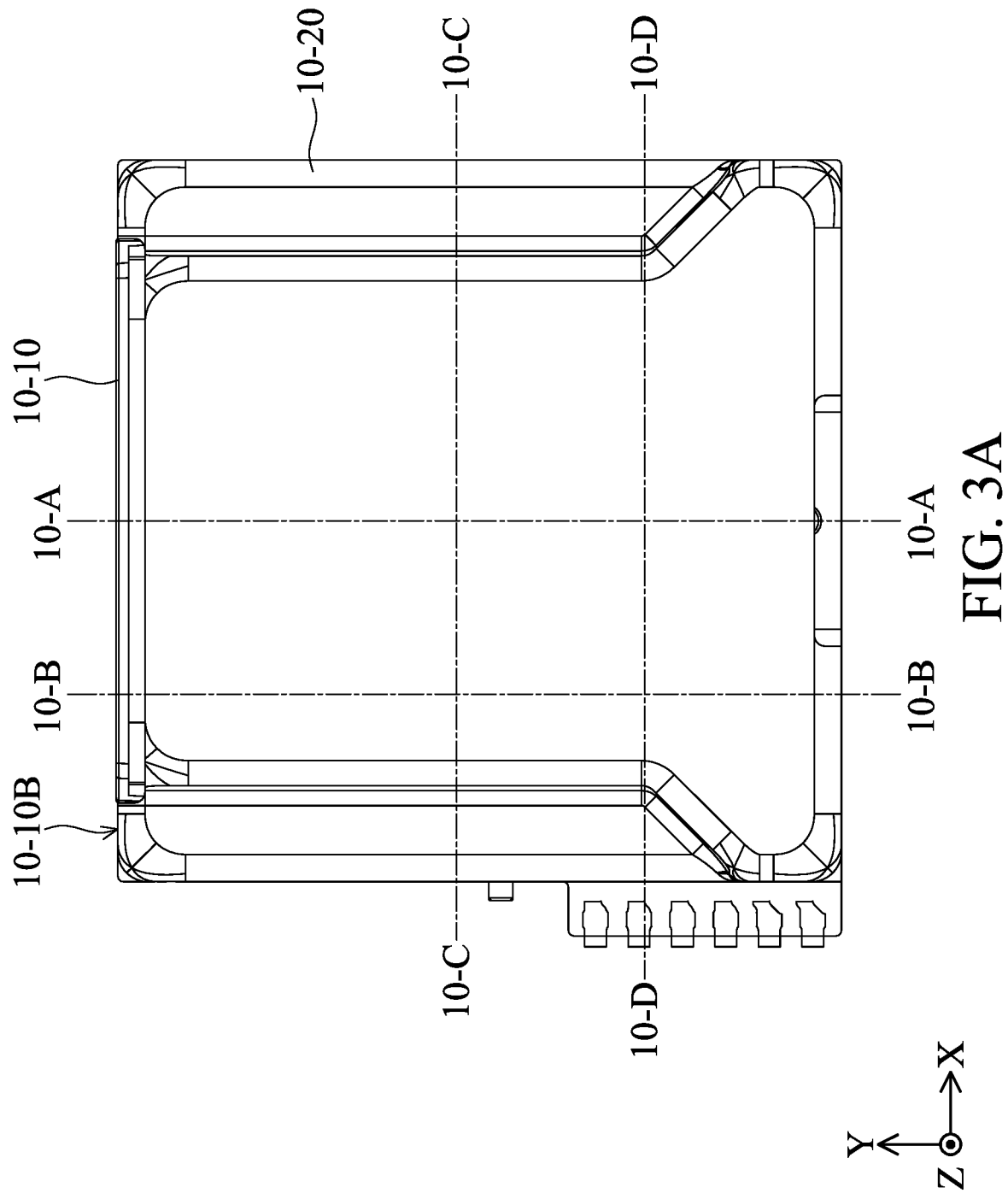
FIG. 3A is a top view of the optical element driving mechanism.

Referring to FIG. 1 to FIG. 3C. FIG. 1 is a perspective view of an optical element driving mechanism 10-100 in some embodiments of the present disclosure. FIG. 2 is an exploded view of the optical element driving mechanism 10-100. FIG. 3A is a top view of the optical element driving mechanism 10-100. FIG. 3B is a bottom view of the optical element driving mechanism. FIG. 3C is an enlarged view of FIG. 3B.

The optical element driving mechanism 10-100 may mainly include a case 10-10, a bottom 10-20, a movable portion 10-30, a coil 10-40, a frame 10-50, a magnetic element 10-60, a first resilient element 10-70, a second resilient element 10-72, and an electronic assembly 10-80. The optical element driving mechanism 10-100 may use for driving an optical element to move to achieve auto focus or optical image stabilization.

Figure 4A:
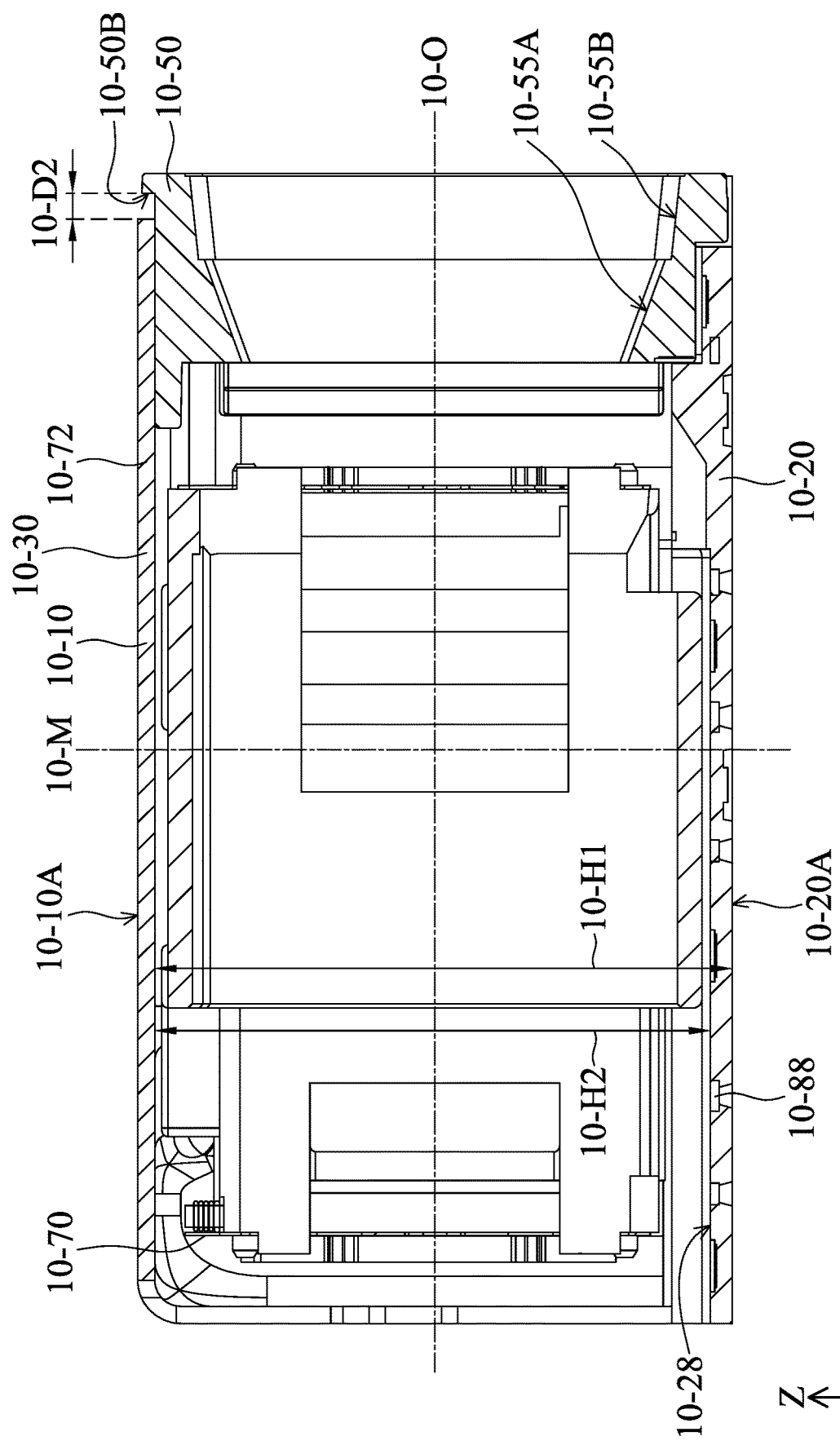
FIG. 4A, FIG. 4B, FIG. 4C, FIG. 4D, and FIG. 4E are cross-sectional views illustrated along lines 10-A-10-A, 10-B-10-B, 10-C-10-C, 10-D-10-D in FIG. 3A and a line 10-E-10-E in FIG. 1.
Figure 4B:
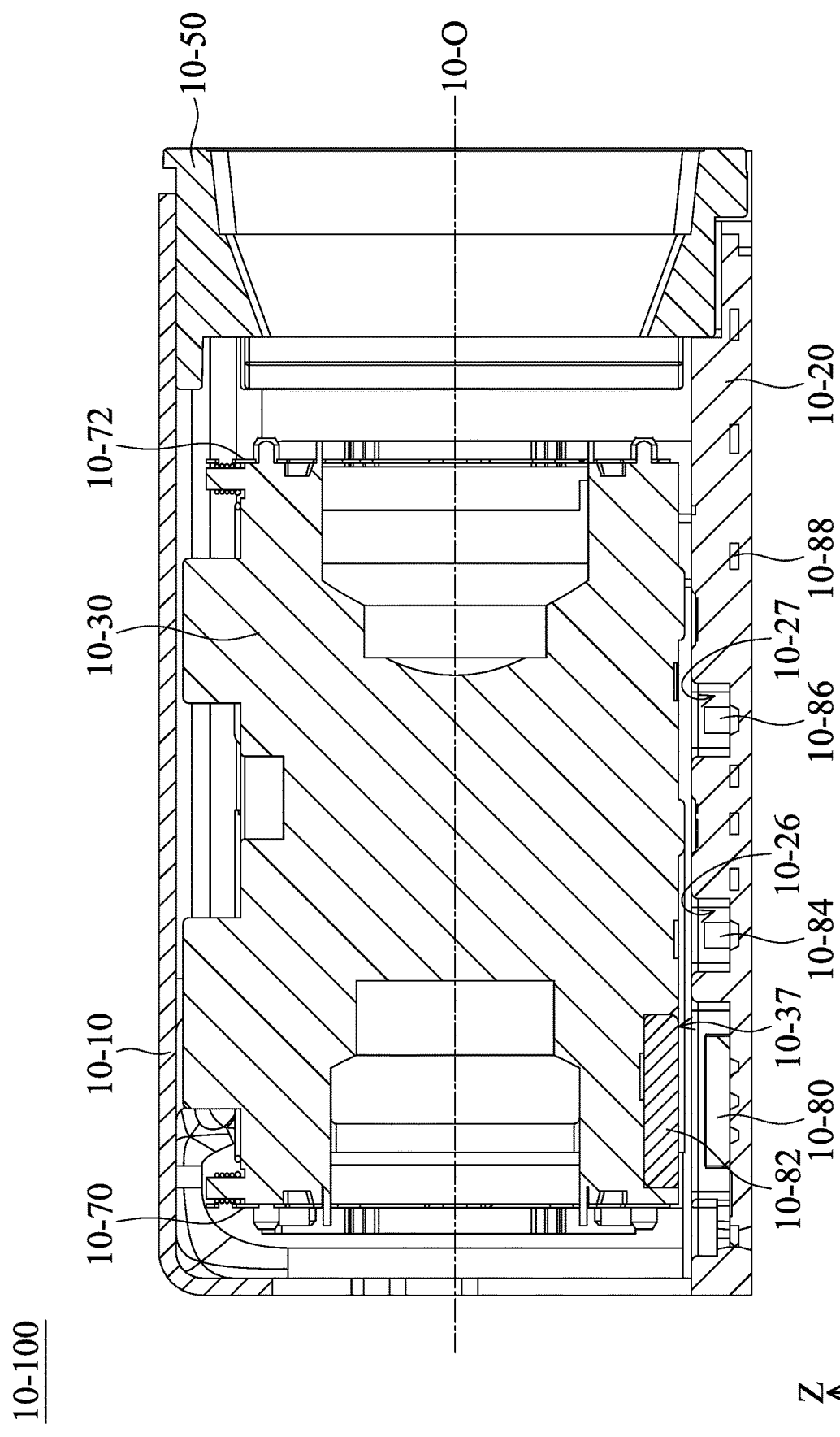
Figure 4C:
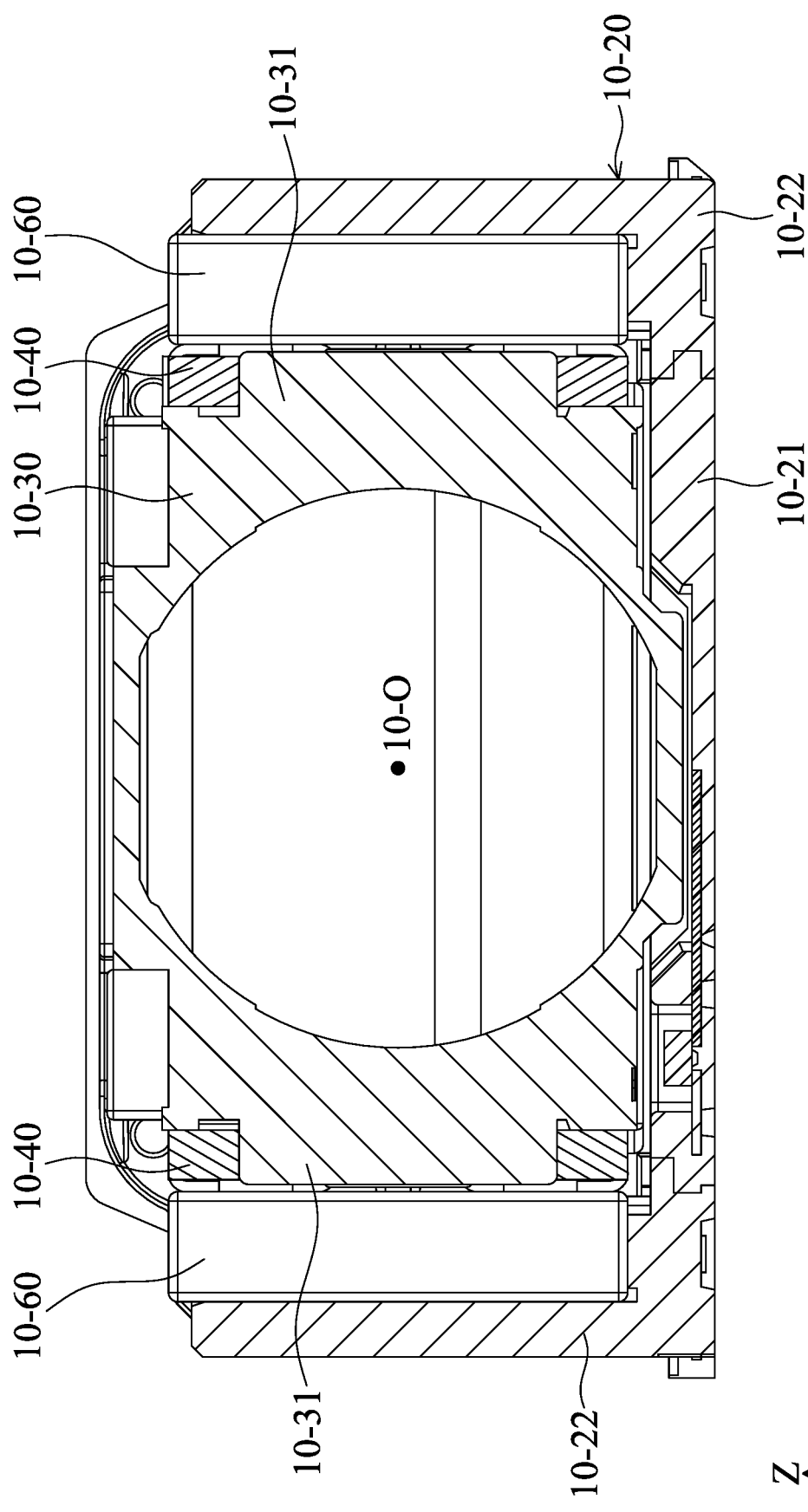
Figure 4D:
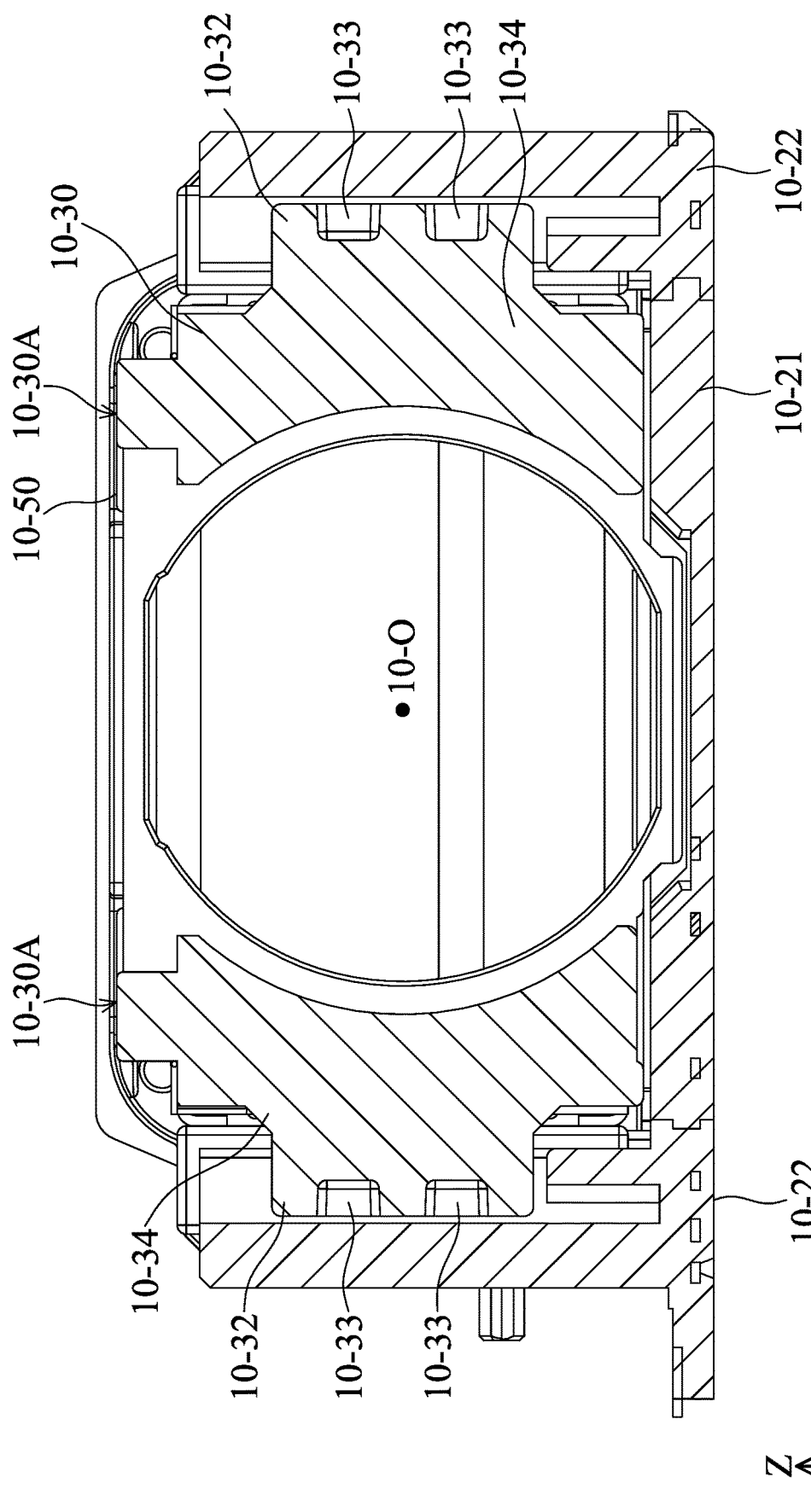
Figure 5A:
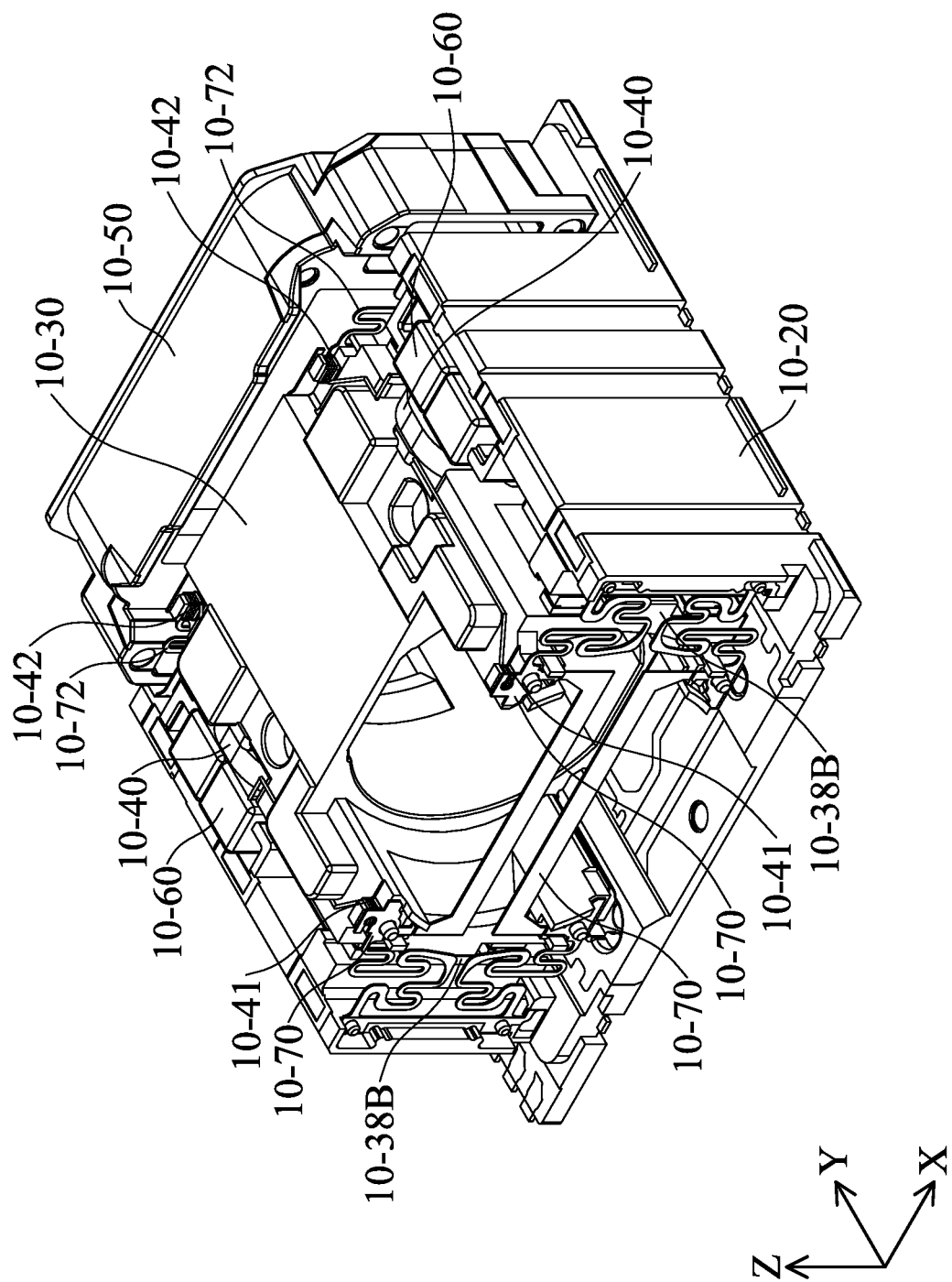
FIG. 5A is a schematic view of some elements of the optical element driving mechanism.
Figure 5B:
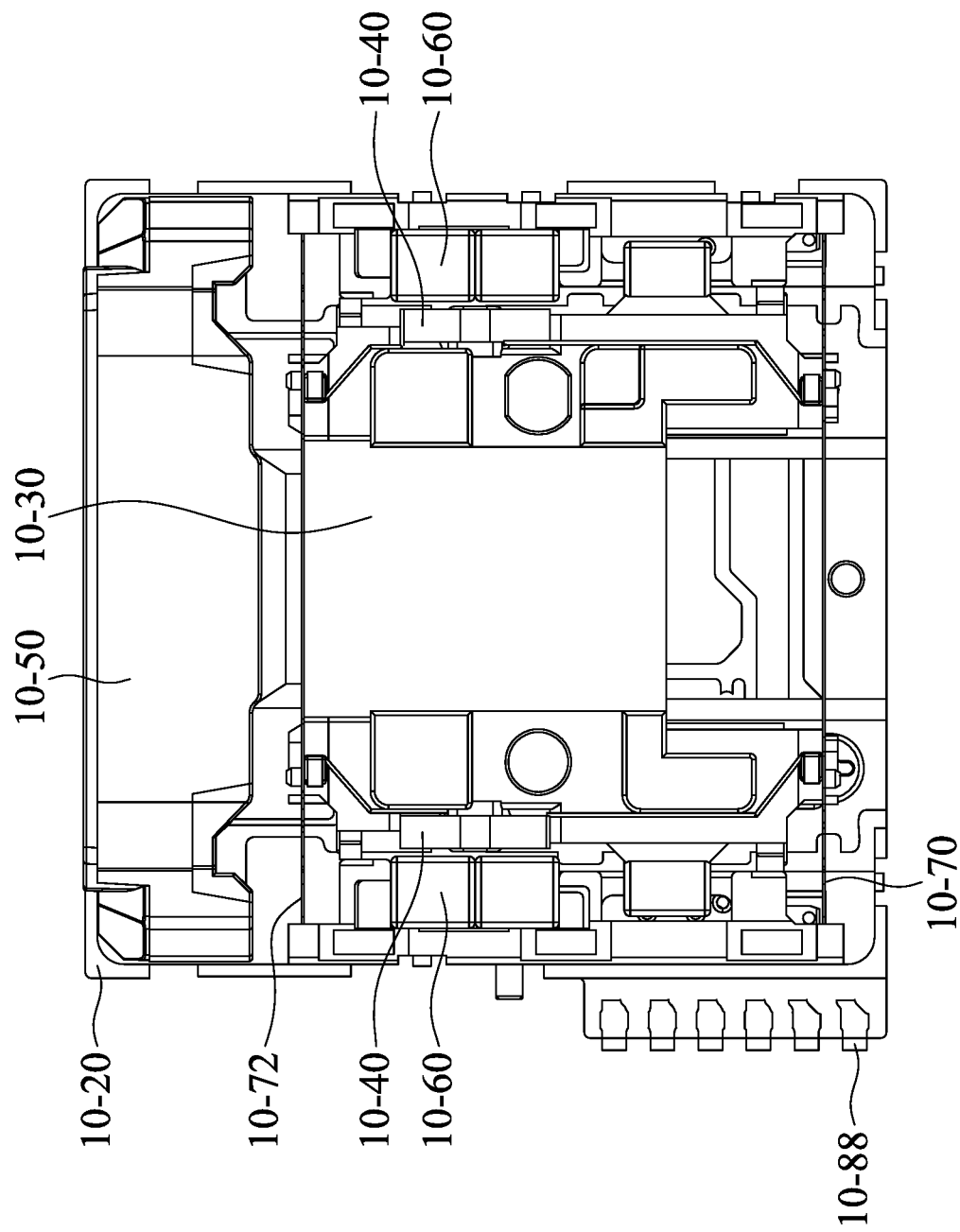
FIG. 5B is a top view of some elements of the optical element driving mechanism.
Figure 5C:
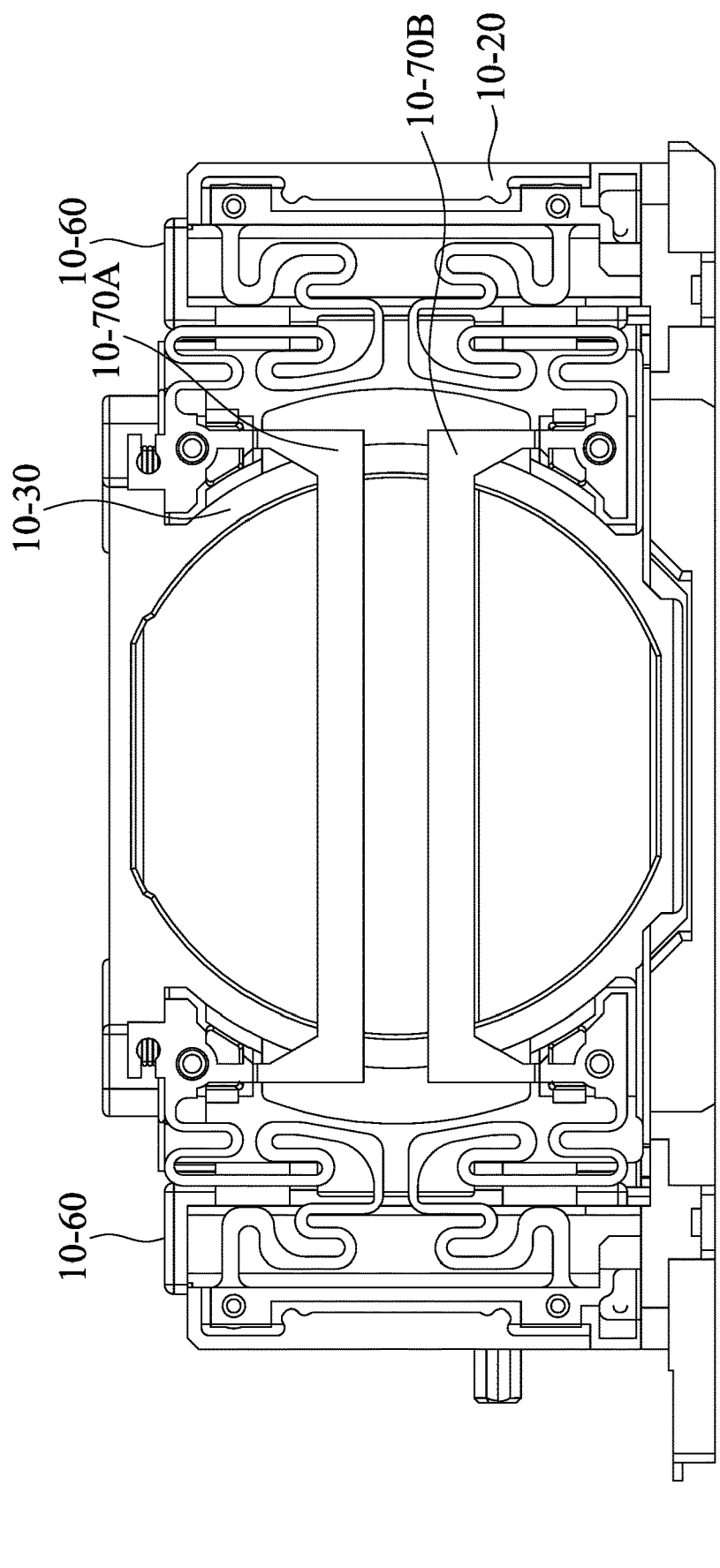
FIG. 5C is a front view of some elements of the optical element driving mechanism.
Figure 5D:
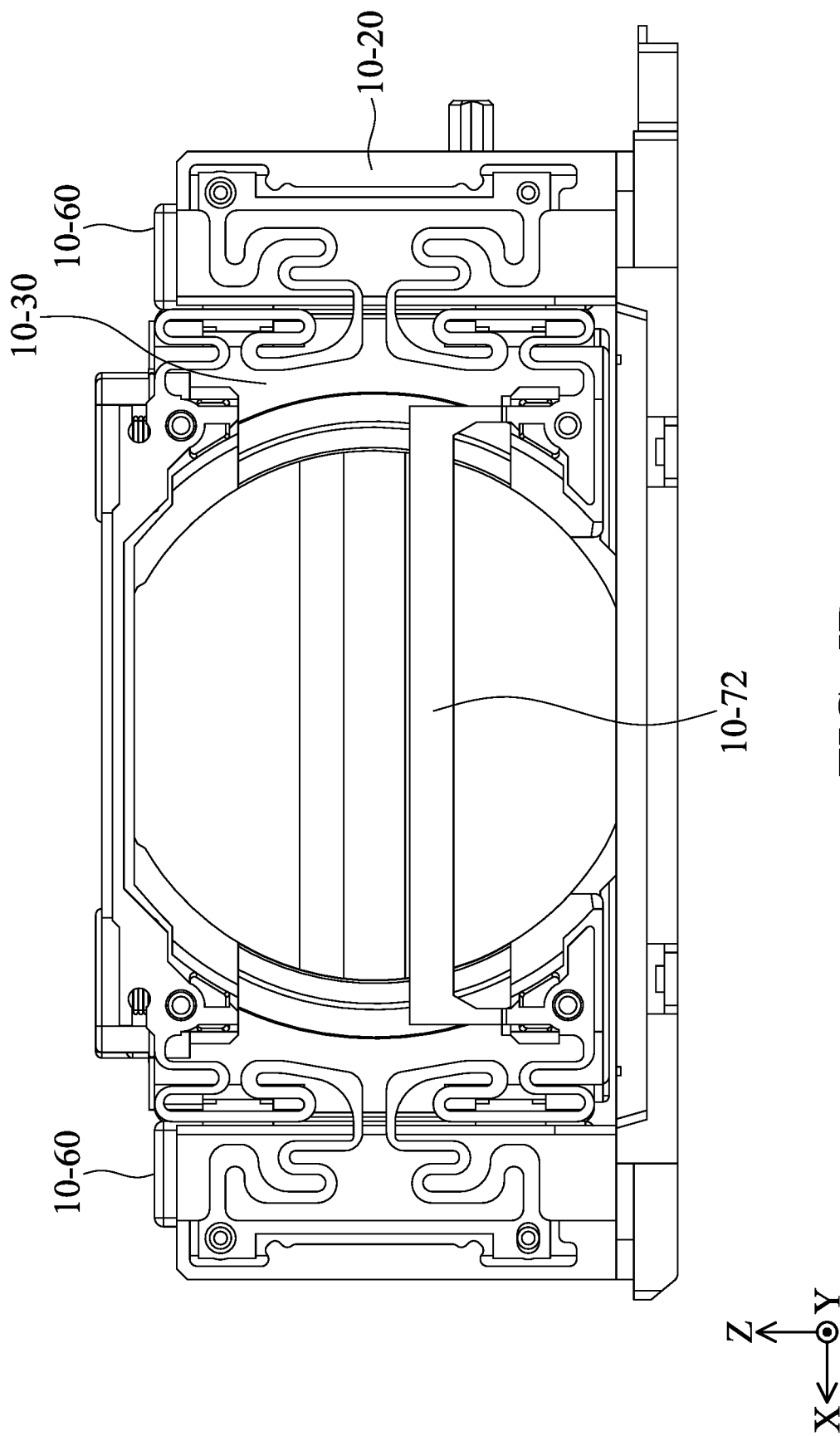
FIG. 5D is a back view of some elements of the optical element driving mechanism.
Figure 5E:
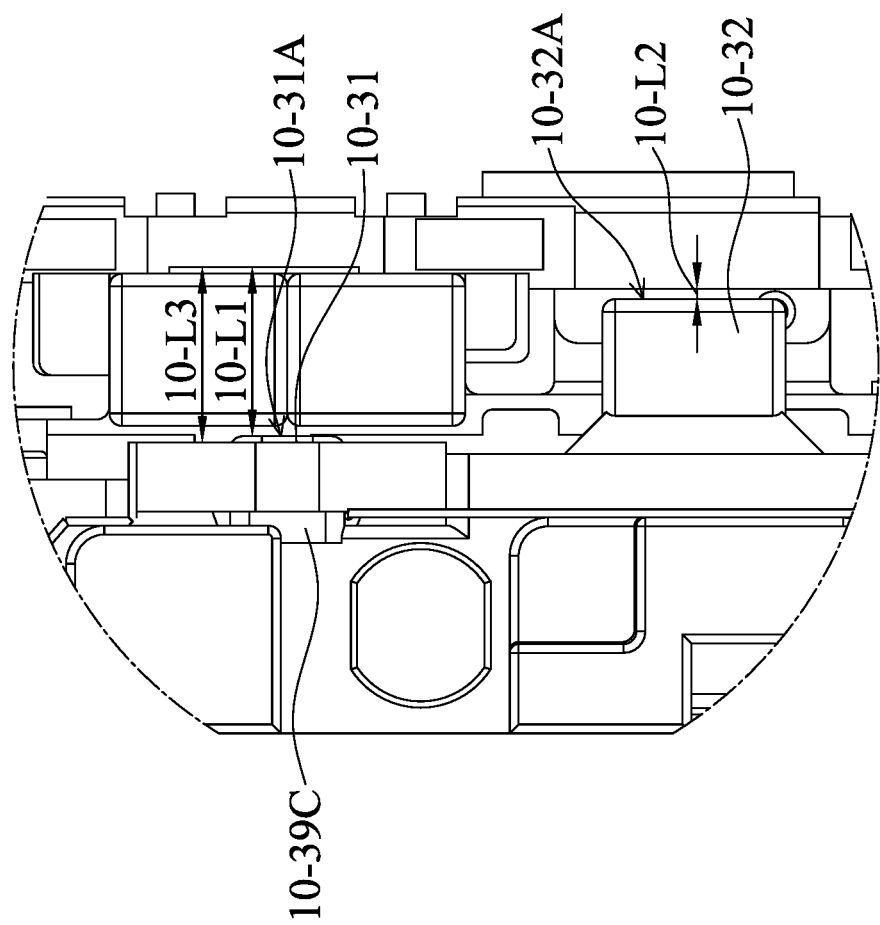
FIG. 5E is an enlarged view of FIG. 5B.
Figure 6A:
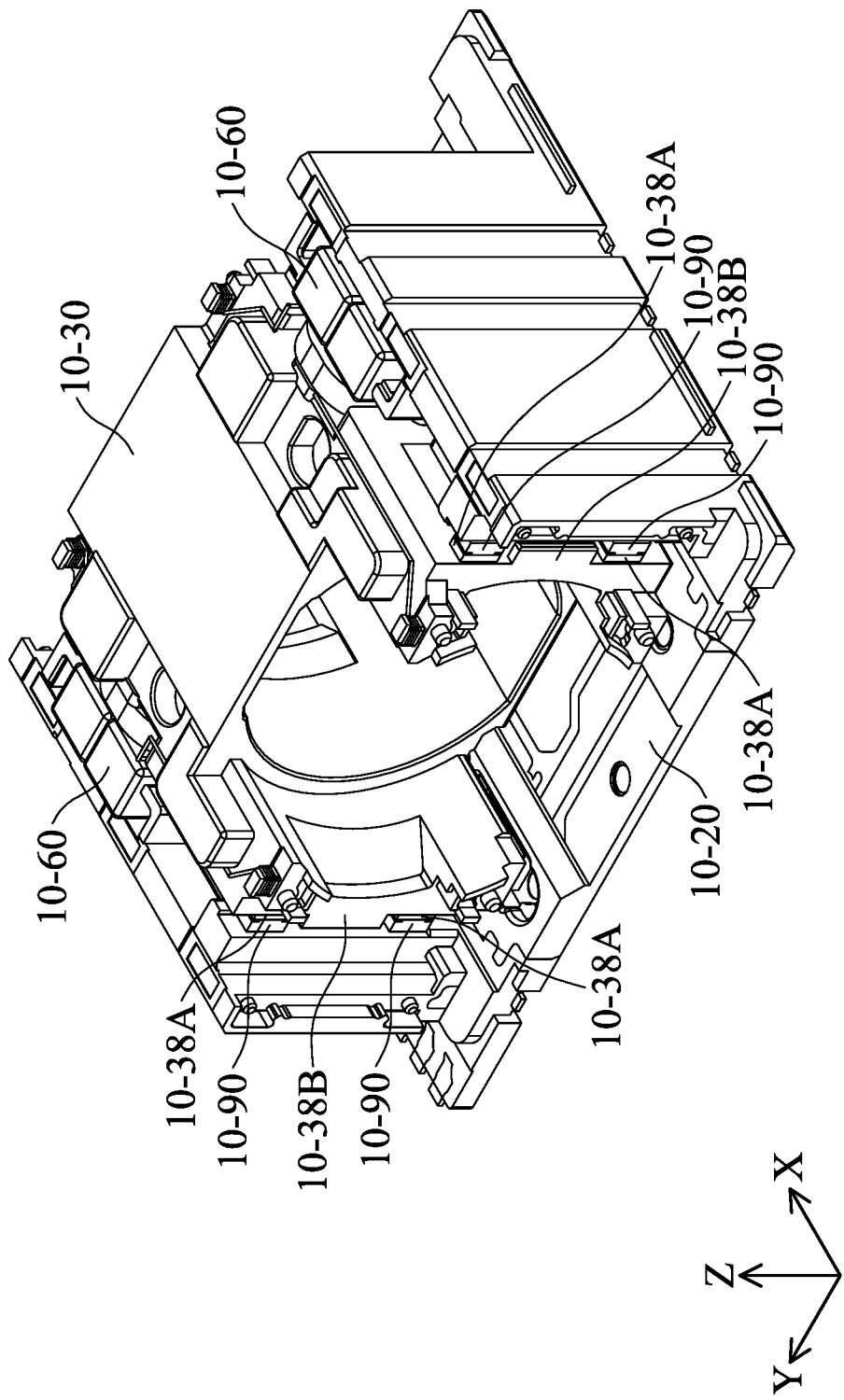
FIG. 6A and FIG. 6B are schematic views of other elements of the optical element driving mechanism viewed in different directions.
Figure 6B:
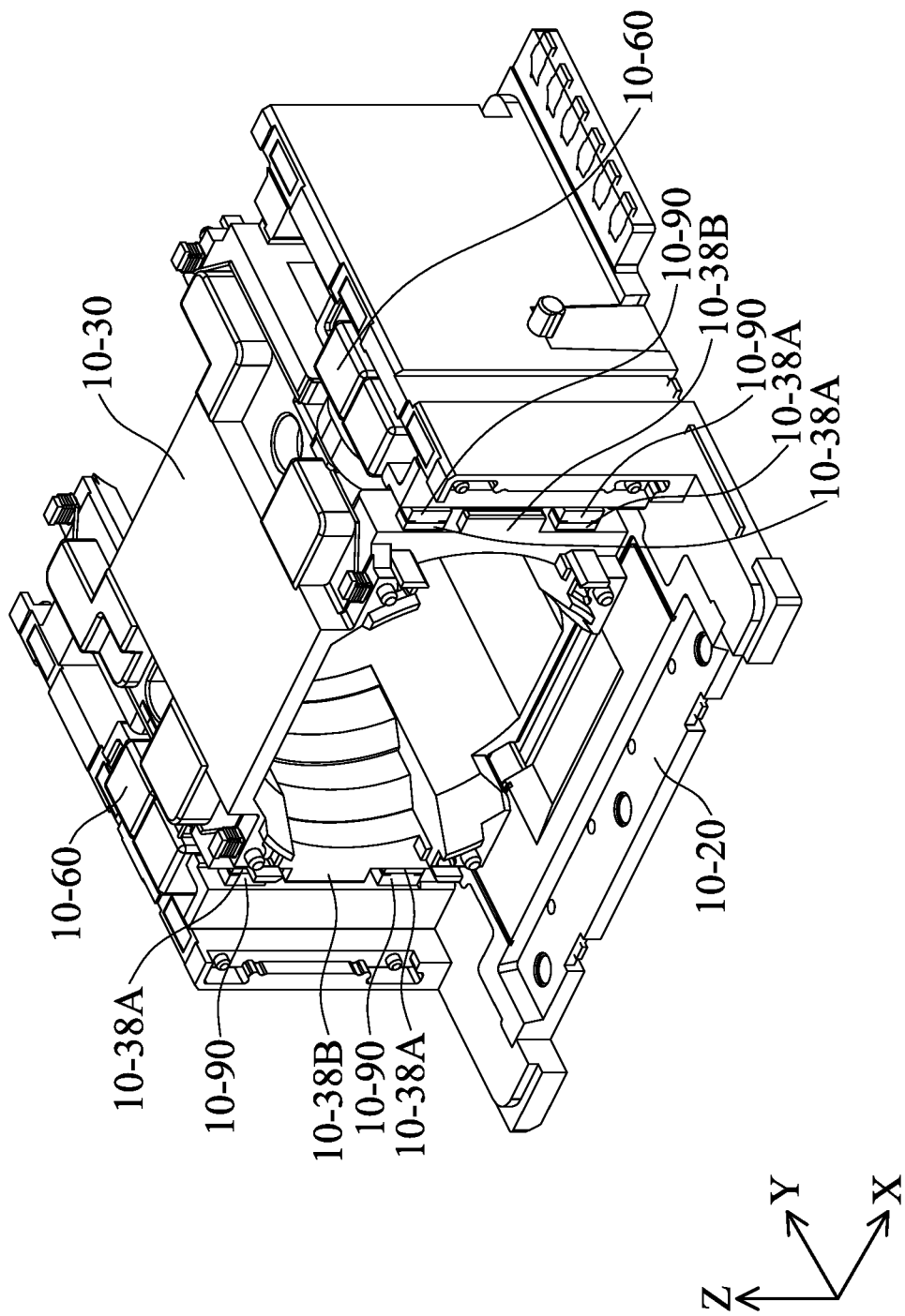
Figure 7A:
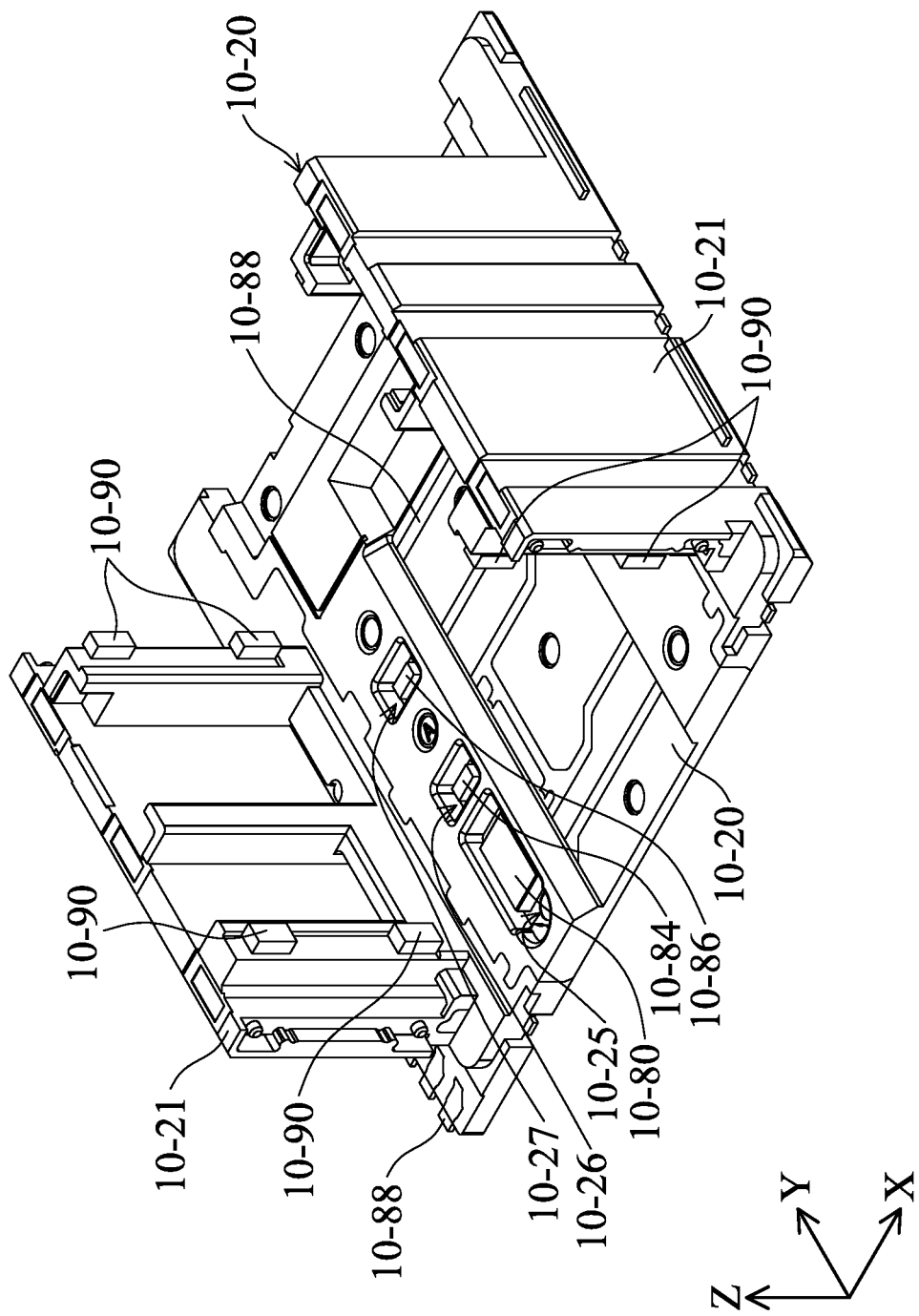
FIG. 7A is a schematic view of the bottom and some elements disposed on the bottom.
Figure 7B:
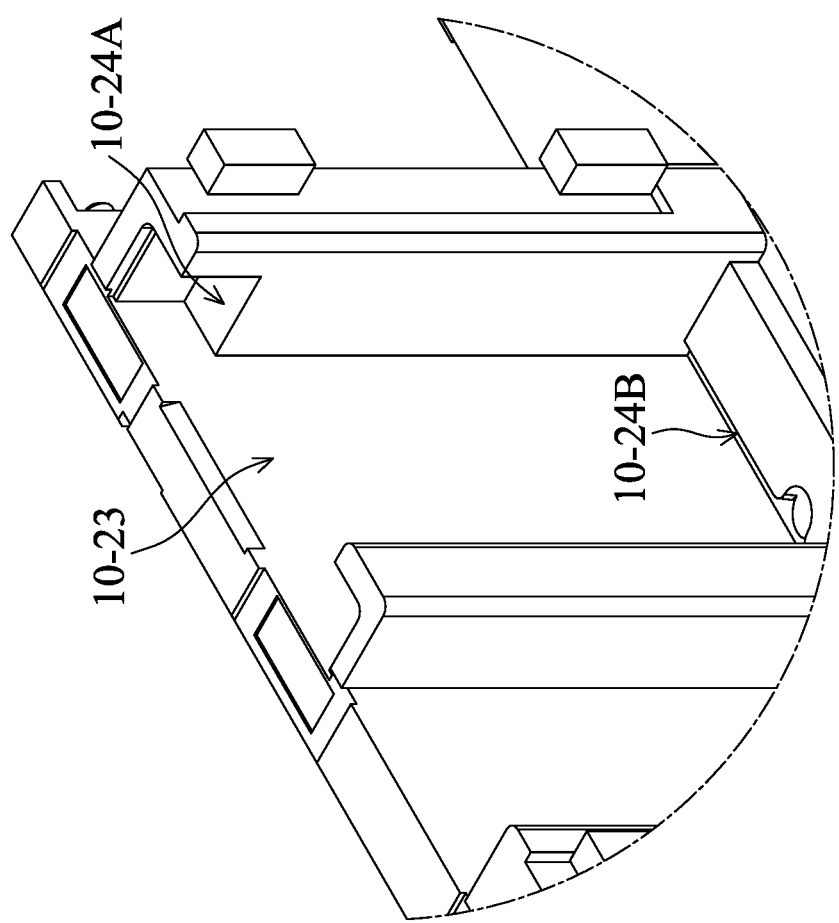
FIG. 7B is an enlarged view of FIG. 7A.
Figure 7C:
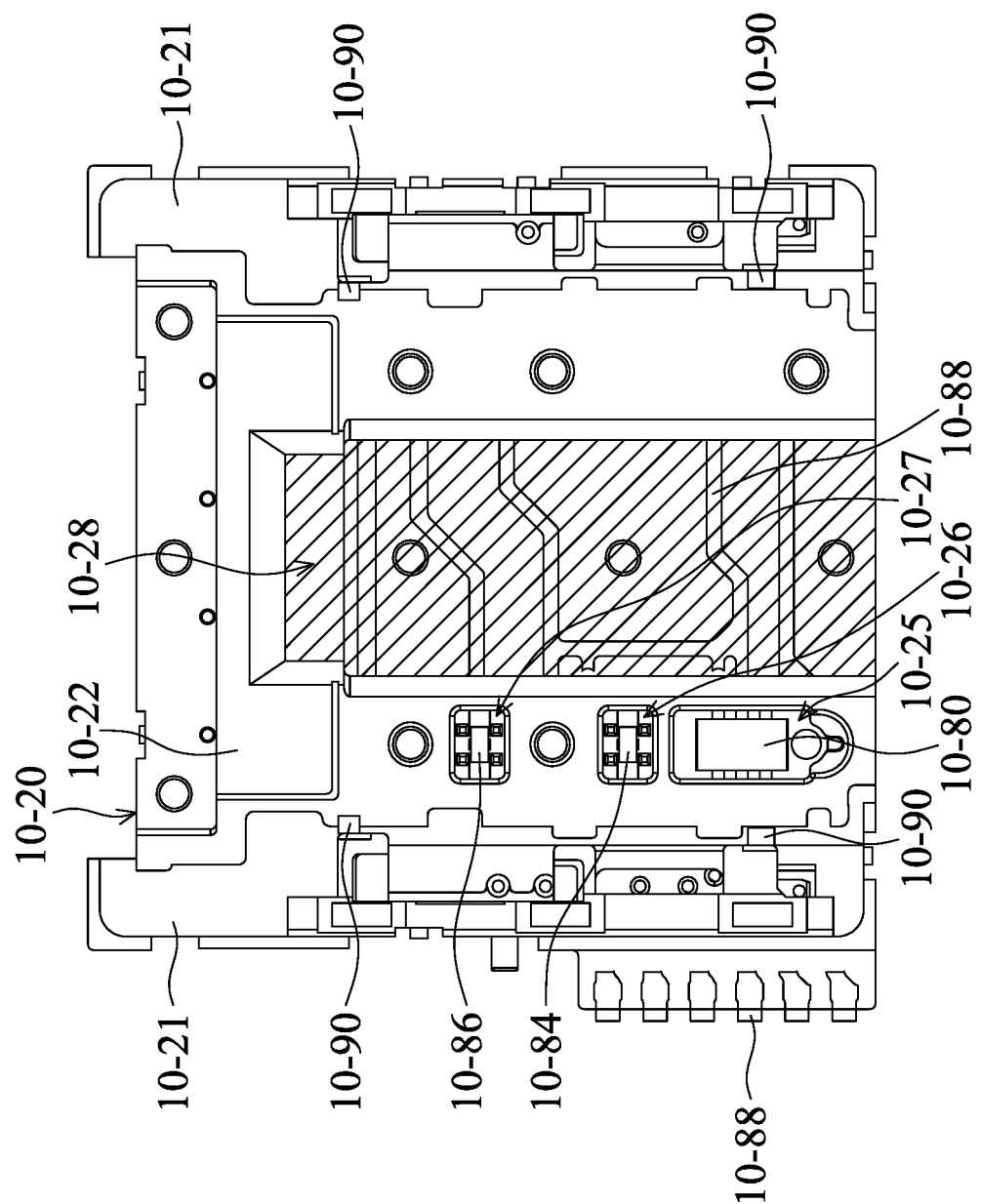
FIG. 7C is a top view of the bottom and some elements disposed on the bottom.
Figure 8A:
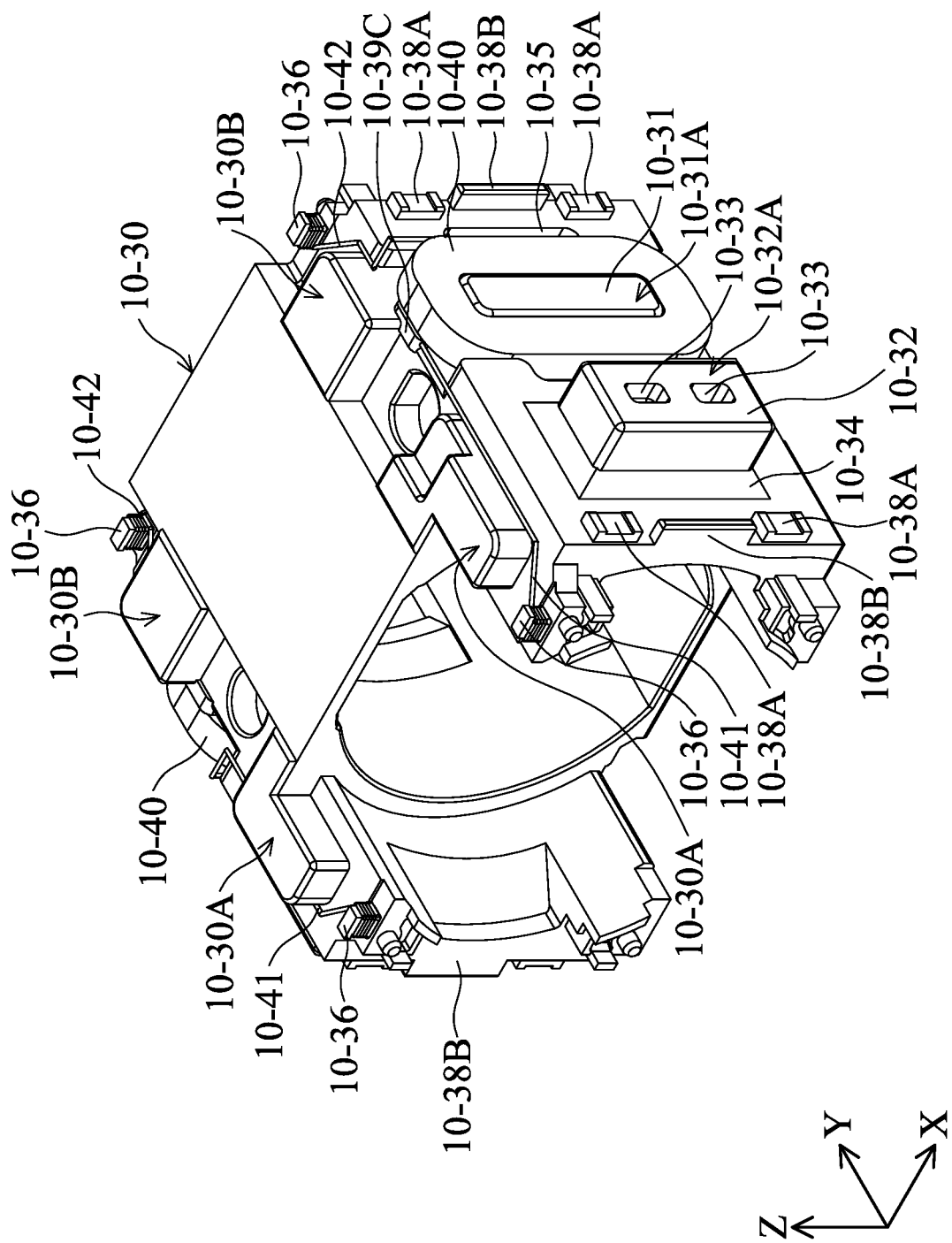
FIG. 8A and FIG. 8B are schematic views of the movable portion and the coil viewed in different directions.
Figure 8B:
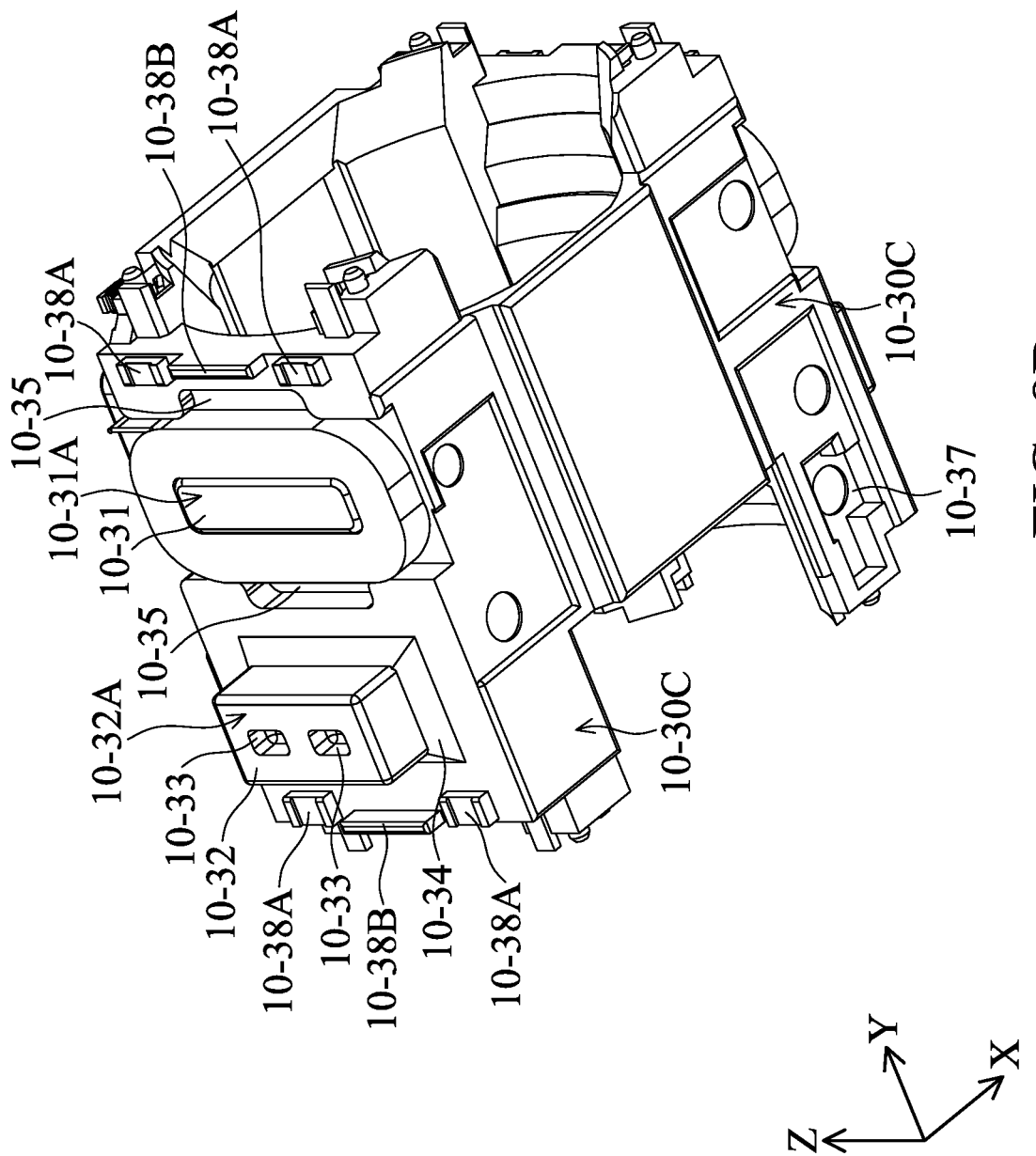
Figure 8C:
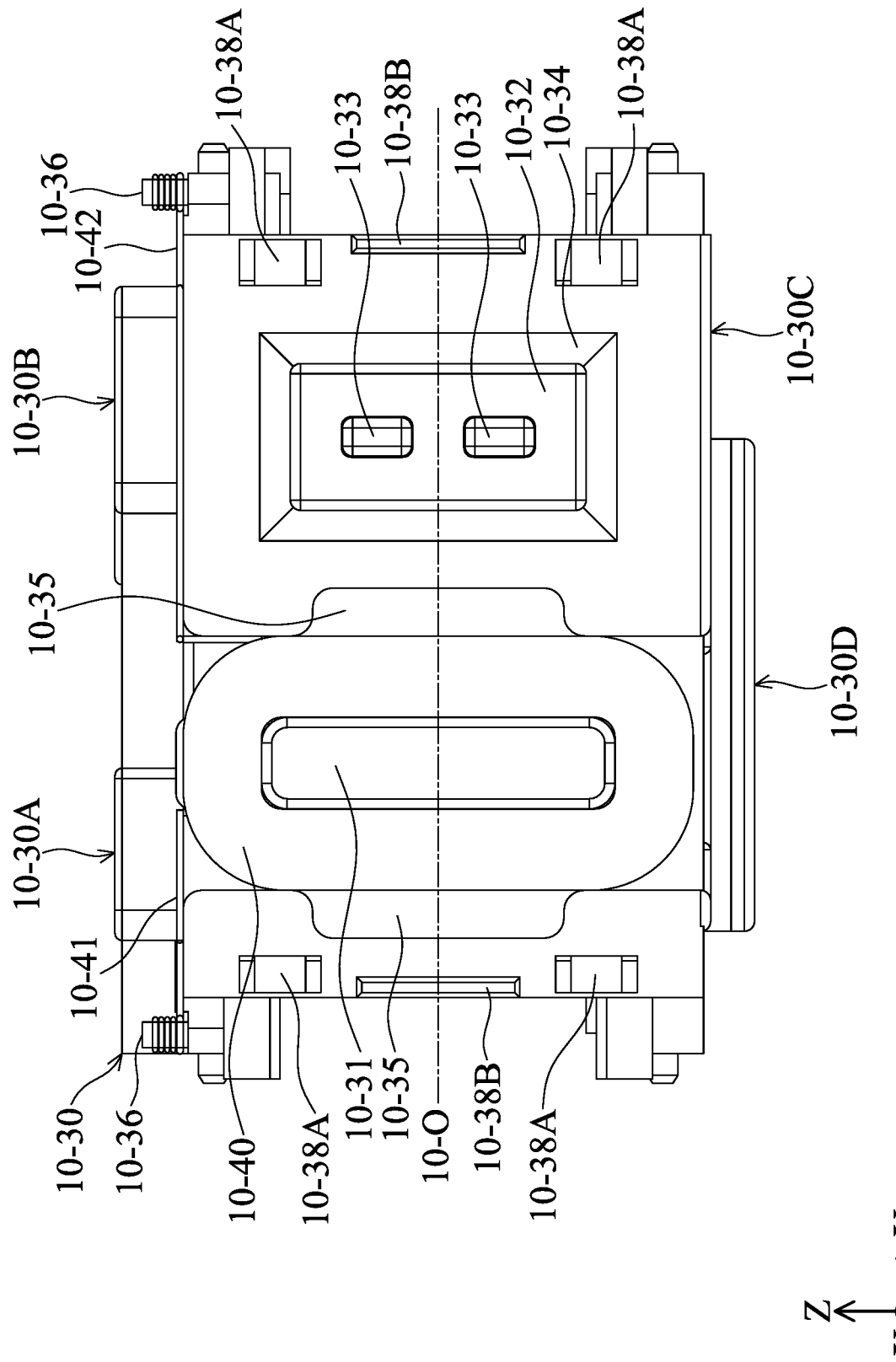
FIG. 8C is a side view of the movable portion and the coil.
Figure 8D:
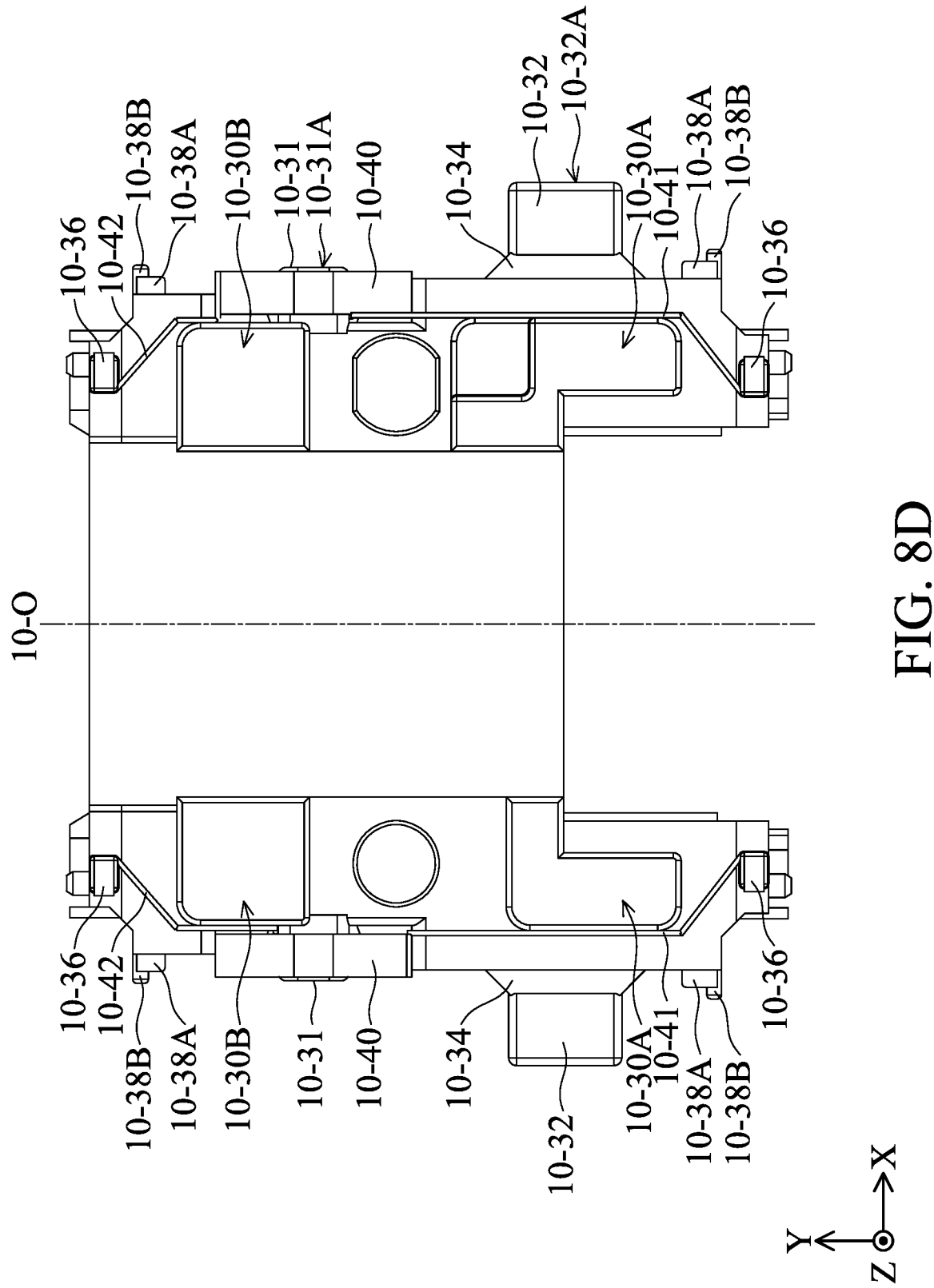
FIG. 8D is a top view of the movable portion and the coil.
Figure 9A:
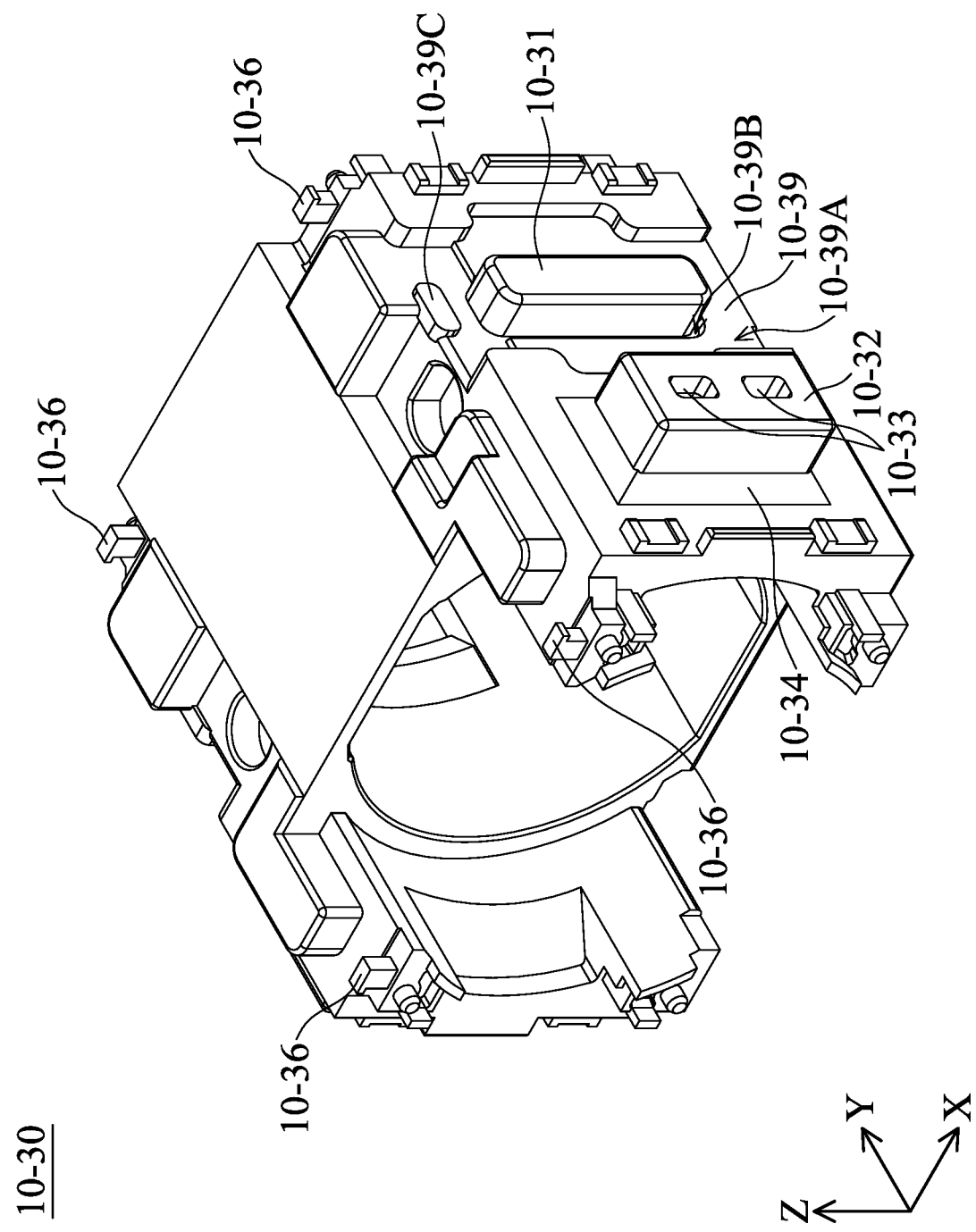
FIG. 9A is a schematic view of the movable portion.
Figure 9B:
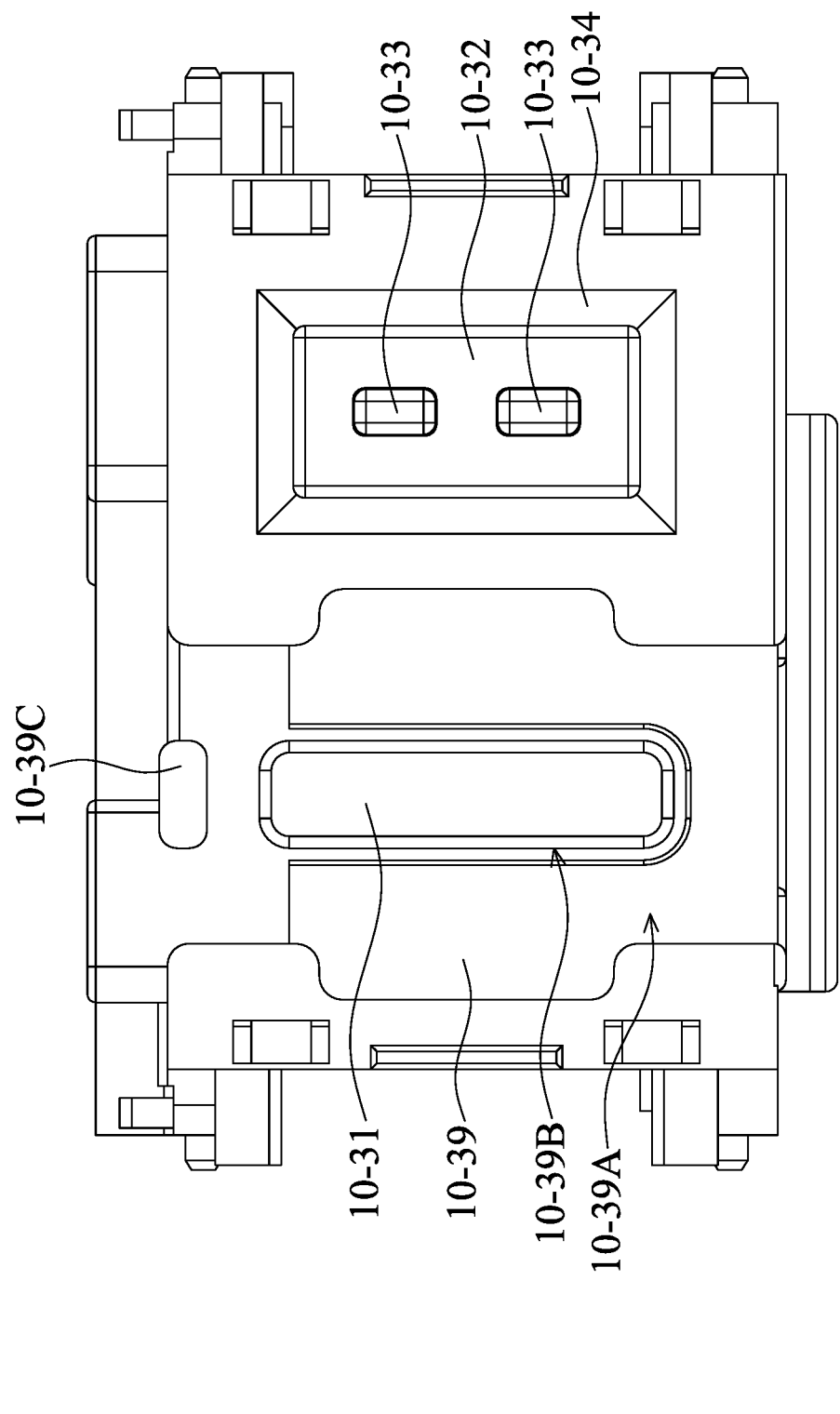
FIG. 9B is a side view of the movable portion.
Figure 9C:
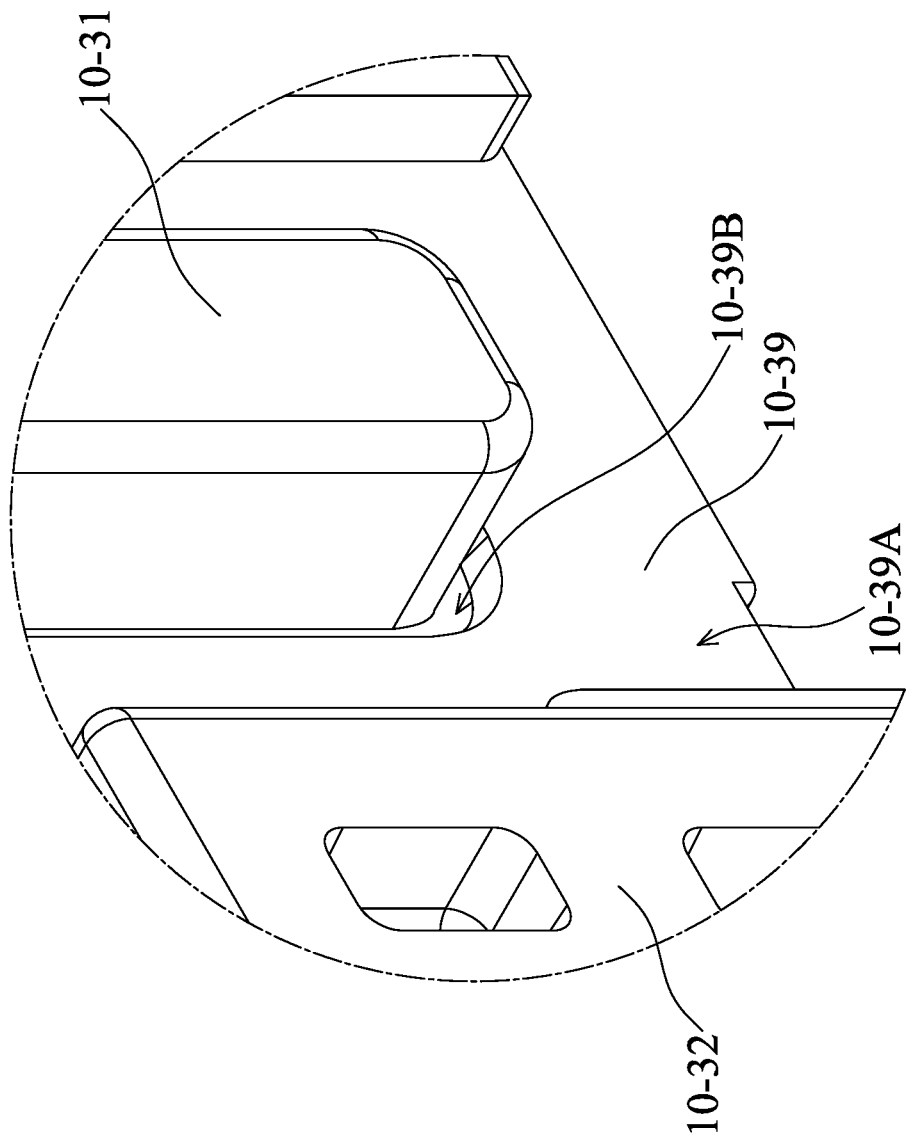
FIG. 9C is an enlarged view of FIG. 9A.
Figure 10:
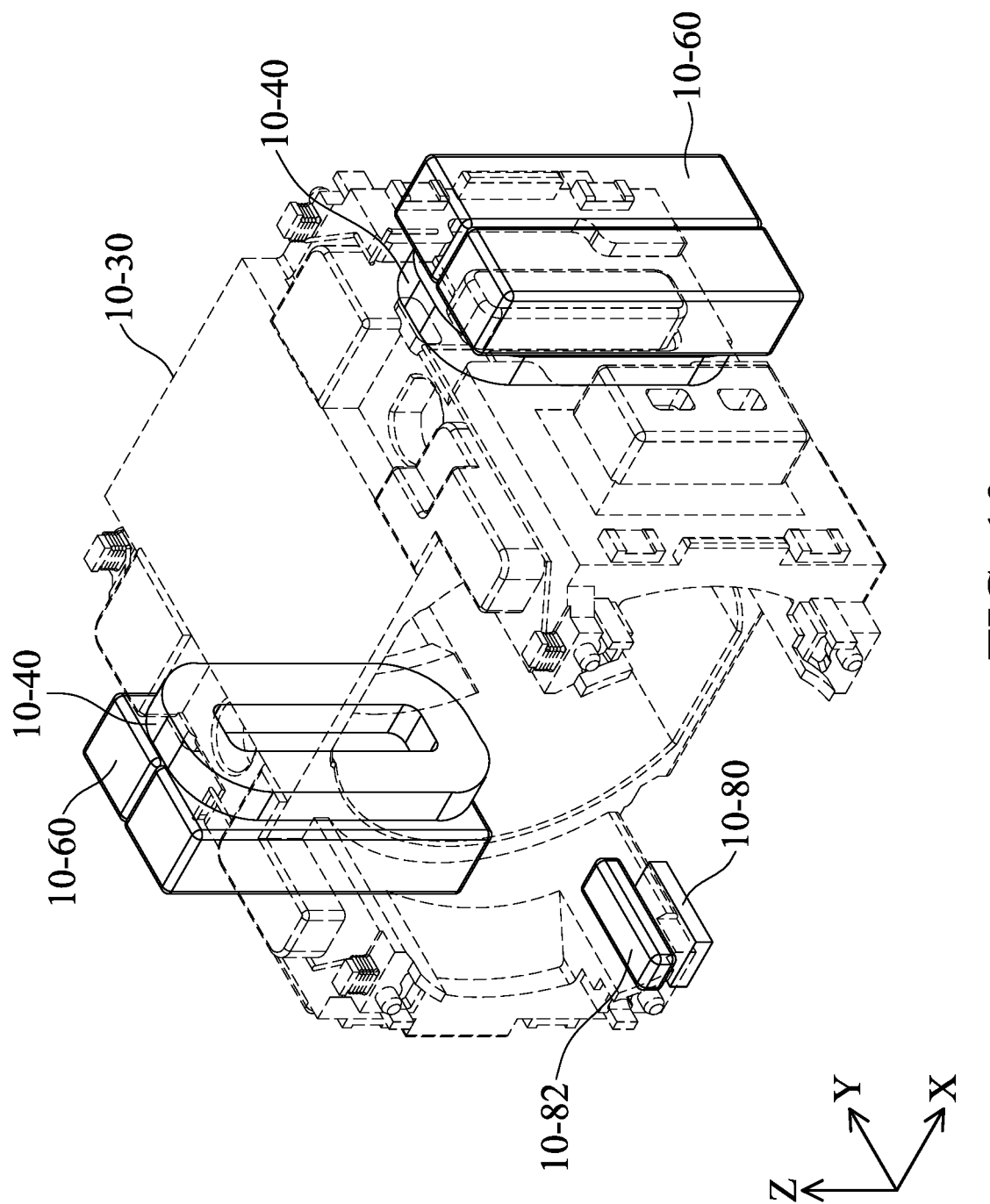
FIG. 10 is a schematic view of some elements of the optical element driving mechanism.
Figure 11A:
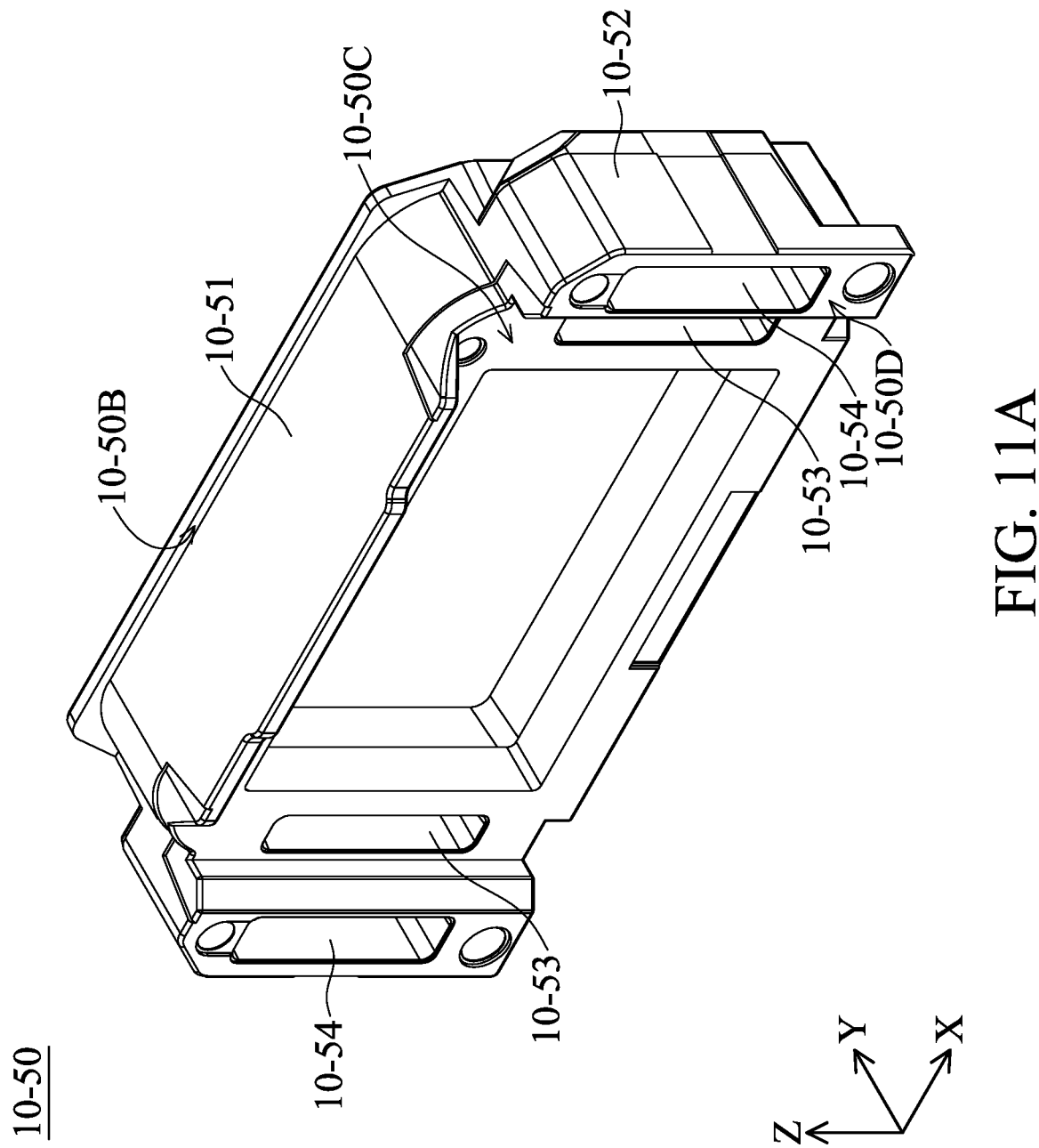
FIG. 11A is a schematic view of the frame.
Figure 11B:
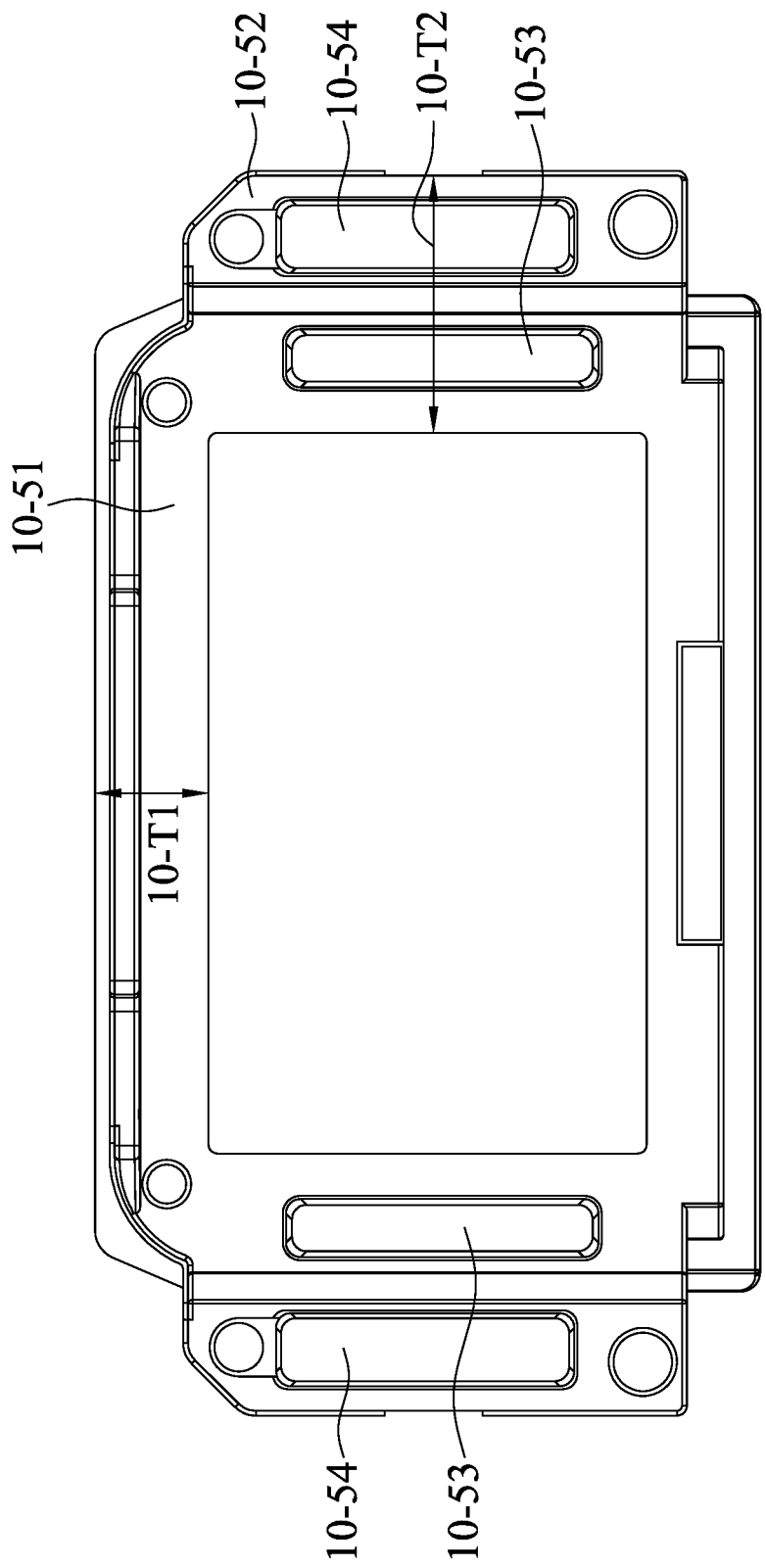
FIG. 11B is a front view of the frame.

FIG. 4A, FIG. 4B, FIG. 4C, FIG. 4D, and FIG. 4E are cross-sectional views illustrated along lines 10-A-10-A, 10-B-10-B, 10-C-10-C, 10-D-10-D in FIG. 3A and a line 10-E-10-E in FIG. 1. FIG. 5A is a schematic view of some elements of the optical element driving mechanism 10-100. FIG. 5B is a top view of some elements of the optical element driving mechanism 10-100. FIG. 5C is a front view of some elements of the optical element driving mechanism 10-100. FIG. 5D is a back view of some elements of the optical element driving mechanism 10-100. FIG. 5E is an enlarged view of FIG. 5B, wherein the case 10-10 is omitted to show other elements inside. FIG. 6A and FIG. 6B are schematic views of other elements of the optical element driving mechanism 10-100 viewed in different directions. FIG. 7A is a schematic view of the bottom 10-20 and some elements disposed on the bottom 10-10. FIG. 7B is an enlarged view of FIG. 7A. FIG. 7C is a top view of the bottom 10-20 and some elements disposed on the bottom 10-20. FIG. 8A and FIG. 8B are schematic views of the movable portion 10-30 and the coil 10-40 viewed in different directions. FIG. 8C is a side view of the movable portion 10-30 and the coil 10-40. FIG. 8D is a top view of the movable portion 10-30 and the coil 10-40. FIG. 9A is a schematic view of the movable portion 10-30. FIG. 9B is a side view of the movable portion 10-30. FIG. 9C is an enlarged view of FIG. 9A. FIG. 10 is a schematic view of some elements of the optical element driving mechanism 10-100. FIG. 11A is a schematic view of the frame 10-50. FIG. 11B is a front view of the frame 10-50.

The case 10-10 and the bottom 10-20 may be called as a fixed portion 10-F. The movable portion 10-30 is movably connected to the fixed portion 10-F. In other words, the movable portion 10-30 is movable relative to the fixed portion 10-F. Moreover, the coil 10-40 and the magnetic element 10-60 may be called as a driving assembly 10-D, which is used for driving the movable portion 10-30 to move relative to the fixed portion 10-F. The first resilient element 10-70 and the second resilient element 10-72 may be called as a support assembly 10-U, and the movable portion 10-30 can be moved relative to the fixed portion 10-F through the support assembly 10-U.

The case 10-10 may include a top wall 10-10A and side walls 10-10B extended from the sides of the top wall 10-10A. The bottom 10-20 and the case 10-10 may arrange along a main axis 10-M. As shown in FIG. 3B and FIGS. 7A to 7C, the bottom 10-20 may include walls 10-21 and a bottom plate 10-22. The walls 10-21 may extend from the sides of the bottom plate 10-22 in the Z direction, and the bottom plate 10-22 may be positioned on the XY plane. The walls 10-21 and the bottom plate 10-22 may be plate-shaped. In other words, the walls are not parallel to the bottom plate 10-22.

In some embodiments, the walls 10-21 and the bottom plate 10-22 may include different materials and different Young's modulus. For example, the Young's modulus of the bottom plate 10-22 may be greater than the Young's modulus of the walls 10-21. In some embodiments, a strengthening element 10-88 may be embedded in the bottom 10-20, such as embedded in the walls 10-21 or the bottom plate 10-22. Moreover, as shown in FIG. 3C, the strengthening element may indirect contact with the case 10-10, and both of the strengthening element 10-88 and the case 10-10 may include metal. For example, at least a portion of the material of the strengthening element 10-88 may be identical to at least a portion of the material of the case 10, and the case 10-10 and the strengthening element 10-88 may be affixed with each other by soldering or welding. Furthermore, the strengthening element 10-88 may exposed from recesses 10-29 of the bottom 10-20, but not extend beyond the case 10-10 in the X direction. Therefore, the strengthening element 10-88 may be protected by the case 10-10 to prevent being collided with other external elements. Adhesive material (not shown) may be disposed in the recesses 10-29 to affix the bottom 10-20 and the case 10-10.

Moreover, as shown in FIG. 7B, recesses 10-23 may be provided on the bottom 10-20, and the magnetic elements 10-60 may be disposed in the recesses 10-23. Furthermore, glue recesses 10-24A and dodge recesses 10-24B may be provided at sides of the recess 10-23. Adhesive material may be provided at the glue recesses 10-24A and the dodge recesses 10-24B to affix the magnetic elements 10-60 and the bottom 10-20. Moreover, the guiding wire of the coil 10-40 may be disposed in the dodge recesses 10-24B to protect the guiding wire of the coil 10-40.

Figure 3B:
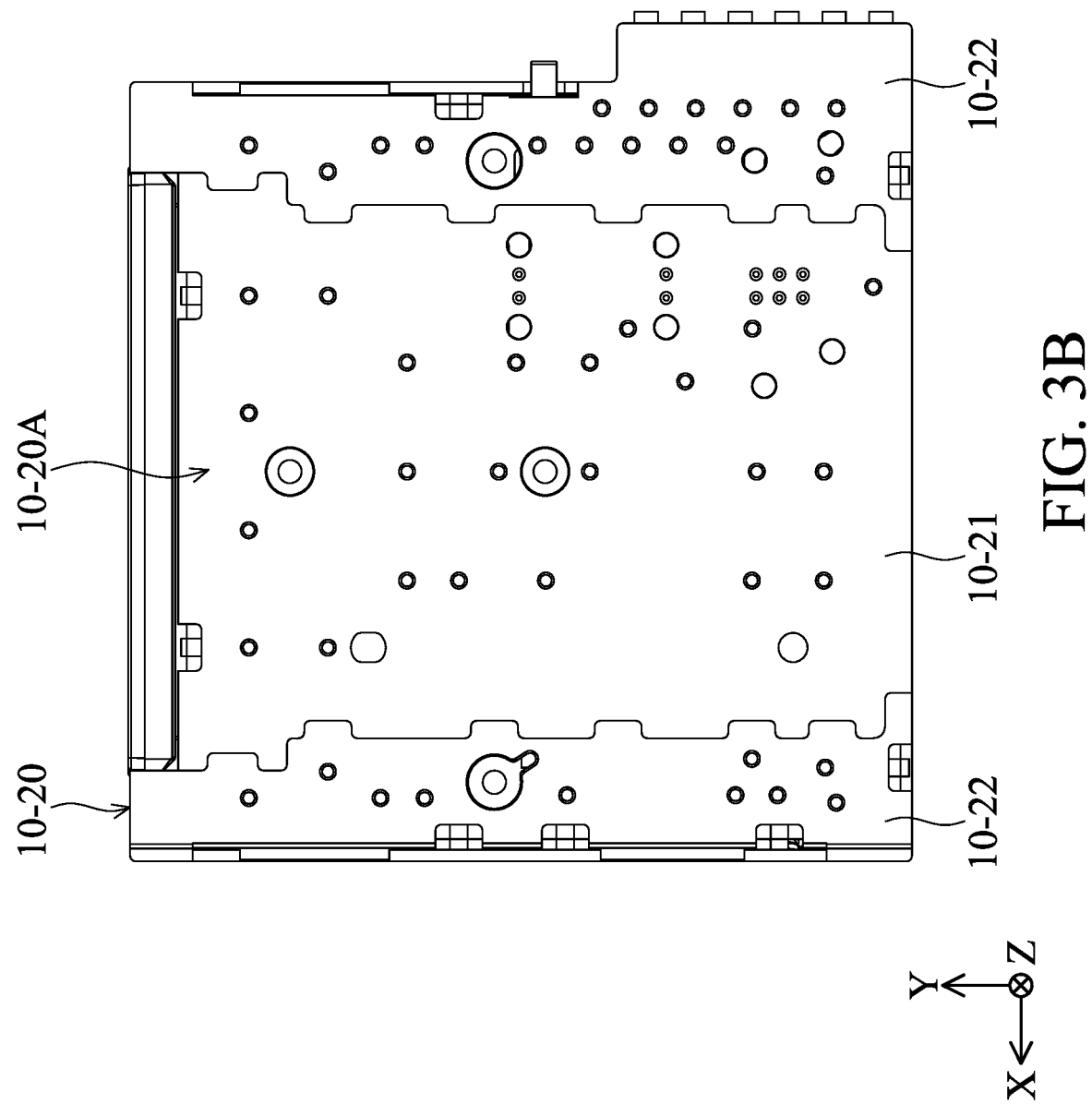
FIG. 3B is a bottom view of the optical element driving mechanism.

In some embodiments, as shown in FIG. 7C, additional reinforcement element 10-28 may be provided on the bottom 10-20, as shown by the inclined lines. The reinforcement element 10-28 may include polymer, and may in direct contact with the strengthening element 10-88 and the bottom 10-20. The reinforcement element 10-28 is not electrically conductive, so may be used for protecting the strengthening element 10-88 to prevent short circuit. Furthermore, as shown in FIG. 3B and FIG. 4A, the bottom 10-20 may include a bottom surface 10-20A that faces away from the case 10-10, and the bottom surface 10-20A may be perpendicular to the main axis 10-M, and parallel to the optical axis 10-O. In the direction of the main axis 10-M extending, the maximum distance 10-H1 between the bottom surface 10-20A and the top wall 10-10A is greater than the maximum distance 10-H2 between the reinforcement element 10-28 and the top wall 10-10A.

In some embodiments, additional circuit may be provided on the bottom 10-20. The circuit is electrically connected to other electronic elements disposed inside or outside the optical element driving mechanism 10-100 to achieve auto focus or optical image stabilization.

In some embodiments, the bottom 10-20 may be formed by multiple steps. For example, the strengthening element 10-88 may be embedded in the bottom plate 10-22 by surface mount technology (SMT). Afterwards, the walls 10-21 may be formed on sides of the bottom plate 10-22. Therefore, the material characteristic (e.g. Young's modulus) of the walls 10-21 and the bottom plate 10-22 may be different, and the deformation of the bottom 10-20 may be reduced.

In some embodiments, the main axis 10-M may be perpendicular to the optical axis 10-O. The case 10-10 and the bottom 10-20 may be combined with each other to form the shell of the optical element driving mechanism 10-100. For example, the bottom surface 10-20 may be affixed to the case 10-10. The case 10-10 has two openings, and light with the optical axis 10-O can enter the optical element driving mechanism 10-100 from the opening that is away from the frame 10-50, and then exit the optical element driving mechanism 10-100 from the opening that is closer to the frame 10-50. An image sensor (not shown) may be disposed on another side of the frame 10-50. Therefore, the optical element that is disposed in the optical element driving mechanism 10-100 may perform focus to the image sensor along the optical axis 10-O.

It should be noted that the interaction between the magnetic element 10-60 and the coil 10-40 may generate a magnetic force, and the magnetic force may move the movable portion 10-30 relative to the fixed portion 10-F along the optical axis 10-O to achieve fast focus.

In this embodiments, the movable portion 10-30 and the optical element disposed therein are movably disposed in the fixed portion 10-F. In detail, the movable portion 10-30 may connect to the bottom 10-20 and be suspended in the fixed portion 10-F through the metal support assembly 10-U (which includes the first resilient element 10-70 and the second resilient element 10-72), see FIG. 3. When current passes to the coil 10-40, the coil 10-40 may interact with the magnetic field of the magnetic element 10-60 to generate an electromagnetic force. The electromagnetic force moves the movable portion 10-30 and the optical element relative to the fixed portion 10-F along the optical axis 10-O, and auto focus is achieved. In some embodiments, the support assembly may be strip-shaped or circular.

As shown in FIG. 4C, FIG. 4D, FIG. 5B, FIG. 5E, FIG. 8A, FIG. 8B, FIG. 8C, and FIG. 8D, the movable portion 10-30 may include a first stopping structure 10-31 and a second stopping structure 10-32 for limiting the movable portion 10-30 to move in a movable range relative to the fixed portion 10-F. The first stopping structure 10-31 and the second stopping structure 10-32 extend in the X direction (first direction), and respectively have a first stopping surface 10-31A and a second stopping surface 10-32A that face the fixed portion (e.g. the case 10-10 or the bottom 10-20). In some embodiments, the first stopping surface 10-31A and the second stopping surface 10-32A may be parallel. As shown in FIG. 5E, the first stopping surface 10-31A and the bottom 10-20 (fixed portion 10-F) has a distance 10-L1, the second stopping surface 10-32A and the bottom 10-20 (fixed portion 10-F) has a distance 10-L2, and the distance 10-L1 and the distance 10-L2 may be different. For example, in some embodiments, the distance 10-L1 may be greater than the distance 10-L2.

Furthermore, as shown in FIG. 8A and FIG. 8B, a first lightening structure 10-33 may be formed on the second stopping surface 10-32A. For example, the first lightening structure 10-33 may be a recess for reducing the weight of the movable portion 10-30, so the required force provided by the driving assembly 10-D to the movable portion 10-30 may be reduced. Therefore, the size of the driving assembly 10-D may be reduced to achieve miniaturization.

Moreover, as shown in FIG. 4D, FIG. 8A to FIG. 8D, an enhance structure 10-34 is provided at the root of the second stopping structure 10-32. The enhance structure has a tilted surface relative to the second stopping surface 10-32A when viewed in a cross-sectional view, such as viewed in FIG. 4D. As a result, the mechanical strength of the second stopping structure 10-32 may be further enhanced, so the second stopping structure 10-32 may be prevented from being damaged when the movable portion 10-30 is moving.

In some embodiments, the coil 10-40 may be affixed to the first stopping structure 10-31, such as winding on the first stopping structure 10-31, and then affixed to the first stopping structure 10-31 by adhesive material. Furthermore, as shown in FIG. 5B, the minimum distance 10-L1 between the first stopping surface 10-31A and the bottom 10-20 (the fixed portion 10-F) is less than the minimum distance 10-L3 between the coil 10-40 and the bottom 10-20 (the fixed portion 10-F). Therefore, when the movable portion 10-30 moves in the X direction, the first stopping structure 10-31 will contact the fixed portion 10-F before the coil 10-40 comes into contact with the fixed portion 10-F, so the coil 10-40 may be prevented from being in direct contact with the fixed portion 10-F to avoid damage. Furthermore, as shown in FIG. 8C, glue recesses 10-35 may be provided on sides of the first stopping structure 10-31, and glue may be filled in the glue recesses 10-30 to affix the position of the coil 10-40 and the movable portion 10-30.

In some embodiments, as shown in FIG. 9A, FIG. 9B, and FIG. 9C, the coil 10-40 may be disposed in an accommodating portion 10-39 of the movable portion 10-30, and a coil surface 10-39A of the accommodating portion 10-39 faces the coil 10-40. A guiding wire accommodating structure 10-39B may be disposed between the accommodating portion 10-39 and the first stopping structure 10-31. The guiding wire accommodating structure 10-39B is recessed from the coil surface 10-39A, and the first stopping structure 10-31 protrudes from the coil surface 10-39A. As a result, the guiding wire of the coil 10-40 may be accommodated in the guiding wire accommodating structure 10-39B and thus may be protected. In some embodiments, the movable portion 10-30 may also include a coil supporting structure 10-39C that protrudes from the coil surface 10-39A and corresponds to the coil 10-40. For example, as shown in FIG. 5E and FIG. 8A, the coil 10-40 may in direct contact with the coil supporting structure 10-39C and at least partially overlaps the coil supporting structure 10-39C in the X direction, so the shape of the coil of the 10-40 may be maintained when the movable portion 10-30 is moving. Moreover, as shown in FIG. 5E, the magnetic element 10-60 at least partially overlaps the first stopping surface 10-31A in the X direction, so the first stopping surface 10-31A may be in contact with the magnetic element 10-60 when the movable portion 10-30 moves in the X direction. Therefore, the maximum movable range of the movable portion 10-30 in the X direction may be defined.

In some embodiments, as shown in FIG. 8A and FIG. 8B, guiding wires 10-41 and 10-42 of the coil may be disposed on wiring portions 10-36 of the movable portion 10-30 to affix the position of the guiding wires 10-41 and 10-42. Furthermore, as shown in FIG. 5A, the guiding wires 10-41 and 10-42 of the coil 10-40 may respectively in direct contact with the first resilient element 10-70 and the second resilient element 10-72 at the wiring portion 10-36, so current may be provided to the coil 10-40 through the first resilient element 10-70 and the second resilient element 10-72. It should be noted that the wiring portion 10-30 may extend from the movable portion 10-30 in the Z direction. In other words, multiple wiring portions 10-36 may be disposed on the same side of the movable portion 10-30.

As shown in FIG. 8A to FIG. 8C, the movable portion 10-30 may include upper surfaces 10-30A, 10-30B and a lower surface 10-30C. The upper surfaces 10-30A and 10-30B may be positioned on the same plane, and may be the closest portions of the movable portion 10-30 to the case 10-10 in the Z direction. Furthermore, the movable portion 10-30 may also include a lower surface 10-30D. Although the distance between the lower surface 10-30D and the optical axis 10-O is greater than the distance between the lower surface 10-30C and the optical axis 10-O in FIG. 8C, the bottom 10-20 has a recess for the reinforcement element 10-28, so the distance between the bottom 10-20 and the lower surface 10-30D may be higher than the distance between the bottom 10-20 and the lower surface 10-30C. In other words, the lower surface 10-30C is the portion of the movable portion 10-30 that is closest to the bottom 10-20 in the Z direction. Therefore, the upper surfaces 10-30A, 10-30B and the lower surface 10-30C may be in contact with the fixed portion 10-F when the movable portion 10-30 moves in the Z direction relative to the fixed portion 10-F, the movable range of the movable portion 10-30 may be defined, and other portions of the movable portion 10-30 may be prevented from being damaged by the fixed portion 10-F in the Z direction.

In some embodiments, as shown in FIG. 5C and FIG. 5D, the first resilient element 10-70 may include a first portion 10-70A and a second portion 10-70B that are separated from each other, and the second resilient element 10-72 may be formed as one piece. Therefore, the electrical connection of the optical element driving mechanism 10-100 may be adjusted.

In some embodiments, as shown in FIG. 4A, FIG. 7A, FIG. 7B, FIG. 8B, and FIG. 10, the electronic assembly 10-80 may be disposed in the first accommodating space 10-25 of the bottom plate 10-22. Furthermore, the movable portion 10-30 may have a second accommodating space 10-37, and a sensed magnetic element 10-82 (e.g. a magnet) may be disposed in the second accommodating space 10-37. The electronic assembly 10-80 may include a sensing element (not shown) to sense the magnetic field of the sensed magnetic element 10-82, so the position of the movable portion 10-30 relative to the bottom 10-20 (fixed portion 10-F) may be detected.

For example, in the direction of the main axis 10-M (Z direction), the entire first accommodating space 10-25 overlaps the second accommodating space 10-37, and the second accommodating space 10-37 does not extend beyond the first accommodating space 10-25. Moreover, in the direction of the main axis 10-M, when the movable portion 10-30 moves in its movable range, the first accommodating space 10-25 still overlaps the entire second accommodating space 10-37, and the second accommodating space 10-37 still does not extend beyond the first accommodating space 10-25. Therefore, the electronic assembly 10-80 may detect the magnetic field of the sensed magnetic element 10-82 no matter where the movable portion 10-30 is, so the position of the movable portion 10-30 relative to the fixed portion 10-F may be achieved.

It should be noted that as shown in FIG. 10, the magnetic element 10-60 and the sensed magnetic element 10-82 may be disposed at different sides of the movable portion 10-30 to prevent interference, so the accuracy of the optical element driving mechanism 10-100 may be enhanced.

As shown in FIG. 7A and FIG. 7C, an additional third accommodating space 10-26 and an additional fourth accommodating space 10-27 may be provided on the bottom 10-20 for additional electronic assemblies 10-84 and 10-86. It should be noted that as shown in FIG. 4B, the heights of the electronic assemblies 10-80, 10-84, and 10-86 are less than the depths of the first accommodating space 10-25, the third accommodating space 10-26, and the fourth accommodating space 10-27, so the movable portion 10-30 may be prevented from in direct contact with the electronic assemblies 10-80, 10-84, and 10-86 when the optical element driving mechanism 10-100 is operating to protect the electronic assemblies 10-80, 10-84, and 10-86. Moreover, the electronic assemblies 10-80, 10-84, and 10-86 may be electrically connected to the circuit embedded in the bottom 10-20 to connect to other external apparatuses.

The electronic assemblies 10-80, 10-84, and 10-86 may include sensor or control elements. The sensor may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, damping elements 10-90 may be provided between the movable portion 10-30 and the fixed portion 10-F (the bottom 10-20) to absorb the vibration generated when the movable portion 10-30 is moving relative to the fixed portion 10-F. The damping elements 10-90 may be gel and may be disposed on accommodating portions 10-38A of the movable portion 10-30. For example, as shown in FIG. 6A and FIG. 6B, the movable portion 10-30 may have four accommodating portions 10-38A at its front side and have four accommodating portions 10-38A at its back side, so multiple damping elements 10-90 may be provided on the movable portion 10-30, and the vibration generated by the movable portion 10-30 may be reduced. In some embodiments, as shown in FIG. 8A and FIG. 8B, the accommodating portion 10-38A may have a recessed shape, so the damping element 10-90 may be disposed in the accommodating portion 10-38A.

Furthermore, the movable portion 10-30 may include resilient element limiting structures 10-38B to define the movable range of the first resilient element 10-70 and the second resilient element 10-72. The resilient element limiting structure 10-38B may protrude from the movable portion 10-30 and may be disposed between two accommodating portions 10-38A. When viewed along the optical axis 10-O, the first resilient element 10-70 or the second resilient element 10-72 may at least partially overlaps the resilient element limiting structures 10-38B, so the first resilient element 10-70 or the second resilient element 10-72 may be in contact with the resilient element limiting structures 10-38B when the movable portion 10-30 moves along the optical axis 10-O, and the position of the first resilient element 10-70 or the second resilient element 10-72 may be limited. It should be noted that the resilient element limiting structures 10-38B are not in contact with the movable portion 10-F when the movable portion 10-30 moves in its movable range to protect the resilient element limiting structures 10-38B. In some embodiments, as shown in FIG. 8D, the length of the resilient element limiting structures 10-38B is higher than the length of the accommodating portion 10-38A in the X direction.

Figure 4E:
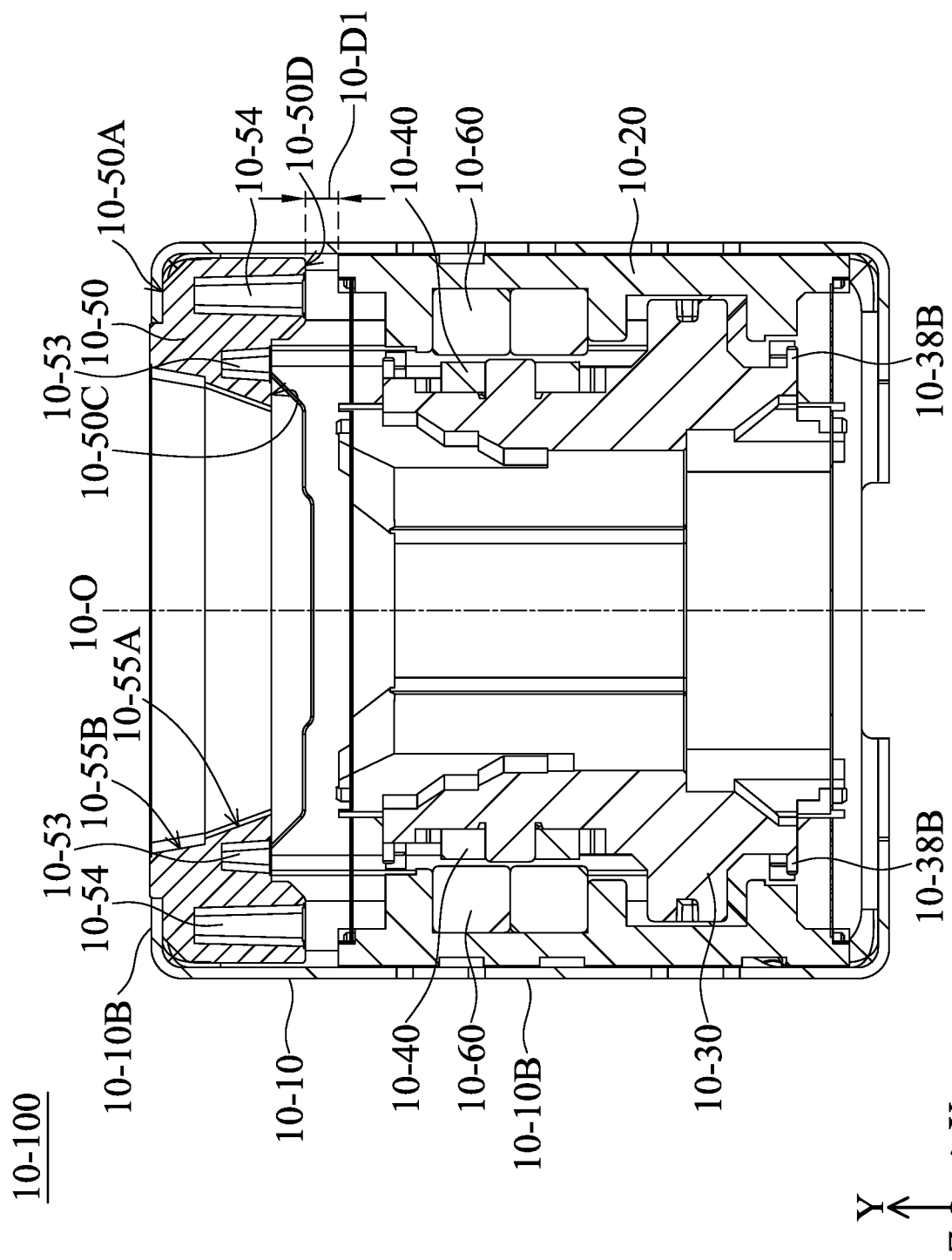

In some embodiments, as shown in FIG. 2, FIG. 4A, FIG. 4E, FIG. 10A, and FIG. 10B, the frame 10-50 may be arranged with the movable portion 10-30 along the optical axis 10-O (the Y direction). The frame 10-50 may include a first frame surface 10-50A and a second frame surface 10-50B that face the case 10-10. In some embodiments, as shown in FIG. 4A and FIG. 4E, the first frame 10-50A and the second frame surface 10-50B are facing different directions; for example, opposite directions. The first frame surface 10-50A faces the side wall 10-10B, and the second frame surface 10-50B faces the top wall 10-10A. In other words, in the direction of the optical axis 10-O, the first frame surface 10-50A at least partially overlaps the side wall 10-10B, and the second frame surface 10-50B at least partially overlaps the top wall 10-10A. Moreover, the first frame surface 10-50A and the second frame surface 10-50B are not parallel to the direction that the optical axis 10-O extends (Y direction), such as may be perpendicular to the optical axis 10-O.

In the direction of the optical axis 10-O, the shortest distance between the first frame surface 10-50A and the case 10-10 is 10-D1, the shortest distance between the second frame surface 10-50B and the case 10-10 is 10-D2, and the shortest distance 10-D1 may be different than the shortest distance 10-D2. In some embodiments, the shortest distance 10-D1 may be greater than the shortest distance 10-D2, but it is not limited thereto. Therefore, higher tolerance of the elements may be endured.

In some embodiments, the frame 10-50 may also include a third frame surface 10-50C and a fourth frame surface 10-50D, wherein the third frame surface 10-50C faces the movable portion 10-30, and the fourth frame surface 10-50D faces the wall 10-21 of the bottom 10-20. In some embodiments, the third frame surface 10-50C and the fourth frame surface 10-50D may perpendicular to the optical axis 10-O. In other words, along the optical axis 10-O, the third frame surface 10-50C at least partially overlaps the movable portion 10-30, and the fourth frame surface 10-50D at least partially overlaps the wall 10-21. Moreover, the first frame surface 10-50A faces a different direction to the third frame surface 10-50C and the fourth frame surface 10-50D, such as are facing opposite directions.

As shown in FIG. 4E, FIG. 11A, and FIG. 11B, a second lightening structure 10-53 may be provided on the third frame surface 10-50C, and a third lightening structure 10-54 may be provided on the fourth frame surface 10-50D. For example, the second lightening structure 10-53 and the third lightening structure 10-54 may be recesses to reduce the weight of the frame 10-50, and the second lightening structure 10-53 and the third lightening structure 10-54 may have different depths. In some embodiments, as shown in FIG. 11B, the frame 10-50 may have a polygonal shape (e.g. rectangular shape), and may have first frame sides 10-51 and second frame sides 10-52. The first frame sides 10-51 extend in a first direction (the X direction), and the second frame sides 10-52 extend in a second direction (the Y direction). When viewed along the optical axis 10-O (Y direction), the width of the first frame side in the Z direction is 10-T1, and the width of the second frame side 10-52 in the X direction is 10-T2, and the width 10-T1 is less than the width 10-T2. Therefore, the second lightening structure 10-53 and the third lightening structure 10-54 may be disposed on the second frame side 10-52 that has a higher width 10-T2. It should be noted that the first direction (the X direction) that the first frame side 10-51 extends is different than the second direction (the Z direction) that the second frame side 10-51 extends, and the first direction and the second direction are perpendicular to the direction that the optical axis 10-O extends (the Y direction).

In some embodiments, the frame 10-50 may also include a first noise-cancelling surface 10-55A and a second noise-cancelling surface 10-55B. The first noise-cancelling surface 10-55A and the second noise-cancelling surface are not parallel and may arrange along the optical axis 10-O, but are not parallel nor perpendicular to the optical axis 10-O. The material on the first noise-cancelling surface 10-55A and the second noise-cancelling surface 10-55A may be different than other part of the frame 10-50, such as a material having low reflectivity (e.g. light absorb material). Alternatively, the roughness of the first noise-cancelling surface 10-55A or the second noise-cancelling surface 10-55B may be changed to achieve a rough structure, wherein the roughness of the first noise-cancelling surface 10-55A or the second noise-cancelling surface 10-55B may be higher than the roughness of the third frame surface 10-50C and the fourth frame surface 10-50D, and the reflectivity of the first noise-cancelling surface 10-55A and the second noise-cancelling surface 10-55B may be less than the reflectivity of the third frame surface 10-50C and the fourth frame surface 10-50D. In other words, light is harder to be reflected by the first noise-cancelling surface 10-55A and the second noise-cancelling surface 10-55B than the third frame surface 10-50C and the fourth frame surface 10-50D, so the reflected noise light may be reduced when the light passing through the optical element driving mechanism 10-100, and the quality of the image gained may be enhanced.

Figure 12A:
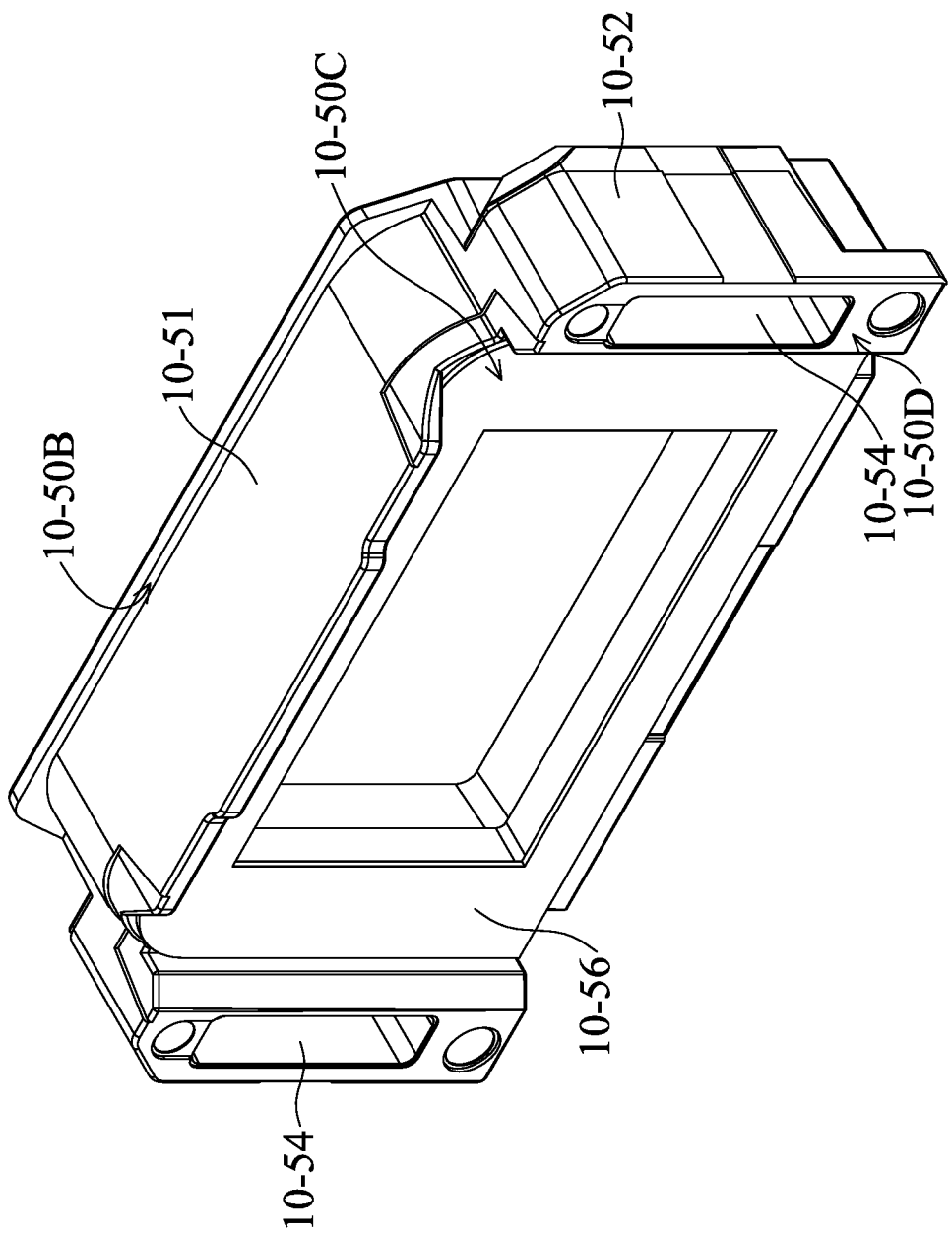
FIG. 12A is a schematic view when an anti-reflect element is disposed on the frame.
Figure 12B:
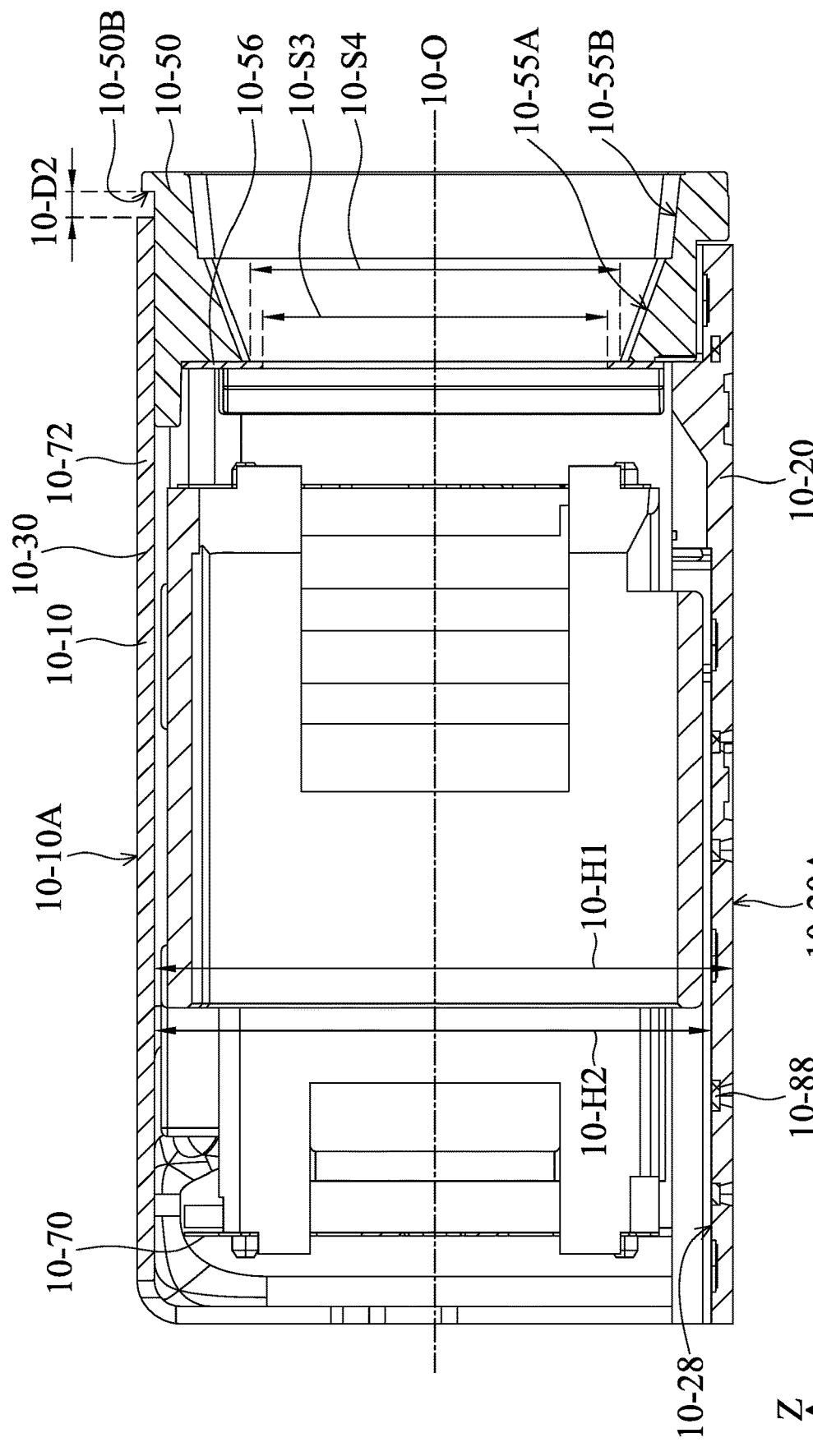
FIG. 12B and FIG. 12C are cross-sectional views of the optical element driving mechanism when the anti-reflect element is disposed on the frame.
Figure 12C:
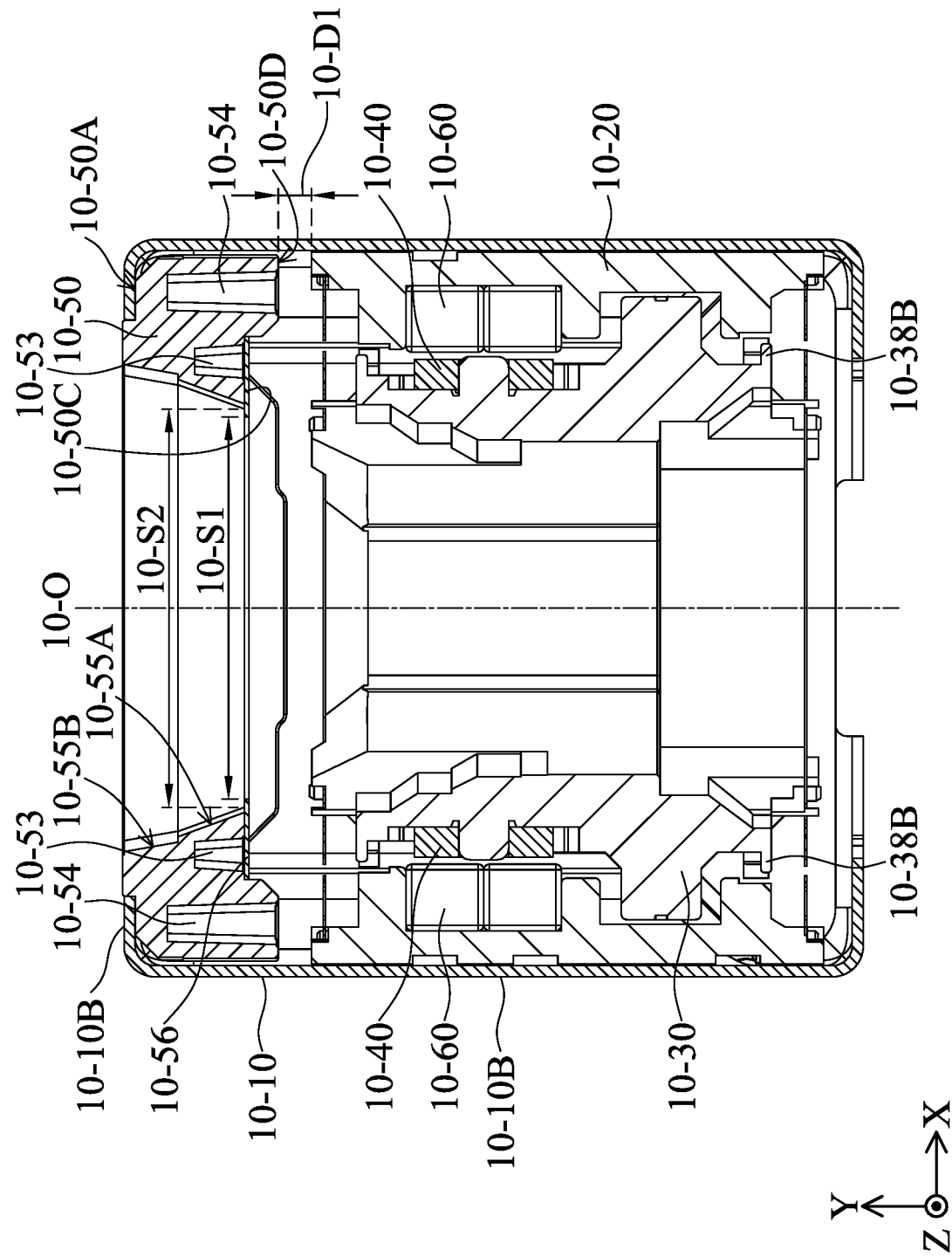
Figure 12D:
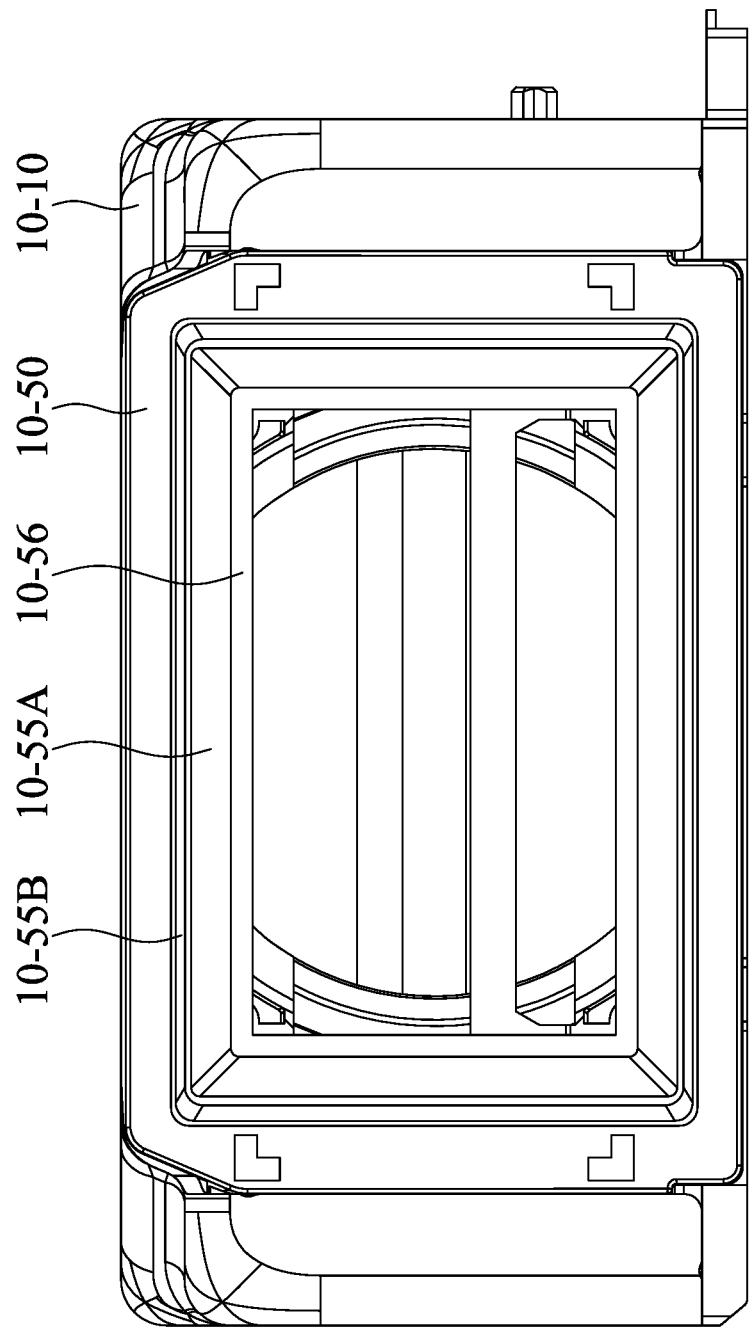
FIG. 12D is a back view of the optical element driving mechanism when the anti-reflect element is disposed on the frame.

In some embodiments, additional anti-reflect element may be provided on the frame 10-50 to further reduce reflected noise light. FIG. 12A is a schematic view when an anti-reflect element 10-56 is disposed on the frame 10-50. FIG. 12B and FIG. 12C are cross-sectional views of the optical element driving mechanism 10-100 when the anti-reflect element 10-56 is disposed on the frame 10-50. FIG. 12D is a back view of the optical element driving mechanism 10-100 when the anti-reflect element 10-56 is disposed on the frame 10-50. As shown in FIG. 12A to FIG. 12D, the plate-shaped anti-reflect element 10-56 may be disposed on the third frame surface 10-50C, such as may cover the entire third frame surface 10-50C. An opening may be formed in the anti-reflect element 10-56, the size 10-S1 of the opening may be less than the size 10-S2 of the minimum opening of the frame 10-50 in the X direction, and the size 10-S3 of the opening may be less than the size 10-S4 of the minimum opening of the frame 10-50 in the Z direction. In other words, as shown in FIG. 12D, the anti-reflect element 10-56 exposes from the opening of the frame 10-40. However, the present disclosure is not limited thereto. For example, in some embodiments, the size 10-S3 may be equal to or higher than the size 10-S4, but the size 10-S1 still less than the size 10-S2. Because the size 10-S2 is less than the size 10-S2, noise light may easily occur in this direction (the Z direction). Therefore, let the size 10-S1 less than the size 10-S2 may prevent noise light from being generated, so the quality of the received image may be enhanced.

The anti-reflect element 10-56 may have a low reflectivity. For example, reflectivity of the anti-reflect element 10-56 may be less than the reflectivity of the surfaces of the frame 10-50, such as less than the reflectivity of the third frame surface 10-50C, or may be less than the reflectivity of the first noise-cancelling surface 10-55A and the second noise-cancelling surface 10-55B. Therefore, noise light may be further reduced to enhance the quality of the gained image.

In summary, an optical element driving mechanism is provided. The optical element driving mechanism includes a movable portion, a fixed portion, a driving assembly, and a support assembly. The movable portion is used for connecting to an optical element. The movable portion may move relative to the fixed portion. The driving assembly is used for driving the movable portion to move relative to the fixed portion. The movable portion is movable relative to the fixed portion through the support assembly.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a movable portion used for connecting to an optical element, and the optical element has an optical axis;
   a fixed portion, wherein the movable portion is movable relative to the fixed portion;
   a driving assembly used for driving the movable portion to move relative to the fixed portion; and
   a support assembly, wherein the movable portion is movable relative to the fixed portion through the support assembly,
   wherein the movable portion comprises:
     a second stopping structure used for limiting the movable portion to move relative to the fixed portion in a movable range, wherein the second stopping structure has a second stopping surface facing the fixed portion; and
     a first lightening structure positioned at the second stopping surface and having a recessed shape, used for reducing the weight of the movable portion.

2. The optical element driving mechanism as claimed in claim 1, wherein:
   the support assembly comprises a resilient element, the movable portion is movably connected to the fixed portion through the resilient element and moves relative to the fixed portion in the movable range;
   the resilient element is plate-shaped;
   the driving assembly comprises a coil and a magnetic element;
   wherein the movable portion comprises:
   a first stopping structure used for limiting the movable portion to move relative to the fixed portion in the movable range.

3. The optical element driving mechanism as claimed in claim 2, wherein:
   the first stopping structure extends in a first direction;
   the second stopping structure extends in the first direction;
   the first stopping structure has a first stopping surface facing the fixed portion;
   the first stopping surface and the second stopping surface are parallel to each other; and
   a minimum distance between the first stopping surface and the fixed portion is different than a minimum distance between the second stopping surface and the fixed portion.

4. The optical element driving mechanism as claimed in claim 3, wherein the movable portion further comprises:
   a coil surface facing the coil;
   a guiding wire accommodating structure recessed from the coil surface, and used for accommodating a guiding wire of the coil;
   a coil supporting structure protruding from the coil surface and corresponding to the coil;
   a resilient element limiting structure having a protruding shape, used for defining a movable range of the resilient element.

5. The optical element driving mechanism as claimed in claim 4, wherein:
   the minimum distance between the first stopping surface and the fixed portion is greater than the minimum distance between the second stopping surface and the fixed portion;
   the coil is affixed to the first stopping structure;

the minimum distance between the first stopping surface and the fixed portion is less than a minimum distance between the coil and the fixed portion; and the first stopping portion protrudes from the coil surface.

6. The optical element driving mechanism as claimed in claim 5, wherein:

the magnetic element at least overlaps a portion of the first stopping surface in the first direction;

the resilient element at least overlaps a portion of the resilient element limiting structure when viewed along the optical axis;

when the movable portion is positioned in the movable range, the resilient element limiting structure is not in contact with the fixed portion.

7. The optical element driving mechanism as claimed in claim 6, wherein the fixed portion comprises:

a case comprising a top wall and side walls extending from sides of the top wall;

a bottom arranged with the case along a main axis, comprising:
 a bottom plate, wherein the bottom plate is plate-shaped;
 a wall, wherein the wall is plate-shaped, and is not parallel to the bottom plate; and
 a strengthening element, wherein at least a portion of the strengthening element is embedded in the bottom plate or the wall; and a reinforcement element, comprising polymer, and in direct contact with the strengthening element.

8. The optical element driving mechanism as claimed in claim 7, wherein:

a Young's modulus of the bottom plate is different than a Young's modulus of the wall;

the strengthening element and the case comprise metal;

at least a portion of the strengthening element is affixed to the case.

9. The optical element driving mechanism as claimed in claim 8, wherein:

the Young's modulus of the bottom plate is higher than the Young's modulus of the wall;

at least a portion of the strengthening element comprises identical material to the case;

the reinforcement element is in direct contact with the bottom;

the bottom comprises a bottom surface facing away from the case.

10. The optical element driving mechanism as claimed in claim 9, wherein:

the bottom surface is perpendicular to the main axis;

the bottom surface is parallel to the optical axis;

a maximum distance between the bottom surface and the top wall is higher than a minimum distance between the reinforcement element and the top wall.

11. The optical element driving mechanism as claimed in claim 10, further comprising:

an electronic assembly disposed in a first accommodating space of the bottom plate; and a frame arranged with the movable portion along the optical axis.

12. The optical element driving mechanism as claimed in claim 11, wherein:

the movable portion further comprises a second accommodating space having a recessed shape and corresponding to the first accommodating space;

the first accommodating space overlaps entire second accommodating space along the main axis, and the second accommodating space does not extend beyond the first accommodating space.

13. The optical element driving mechanism as claimed in claim 12, wherein:

the frame comprises a first frame surface and a second frame surface facing the case, wherein the first frame surface and the second frame surface are facing different directions;

the first frame surface and the second frame surface are not parallel to the optical axis.

14. The optical element driving mechanism as claimed in claim 13, wherein:

when the movable portion is in the movable range, the first accommodating space overlaps the entire second accommodating space along the main axis;

the first frame surface and the second frame surface are facing opposite directions;

the first frame surface and the second frame surface are perpendicular to the optical axis;

the first frame surface faces the side wall;

the second frame surface faces the top wall.

15. The optical element driving mechanism as claimed in claim 14, wherein:

a minimum distance between the first frame surface and the side wall is different than a minimum distance between the second frame surface and the top wall;

the first frame surface overlaps at least a portion of the side wall along the optical axis;

the second frame surface at least overlaps a portion of the top wall along the optical axis.

16. The optical element driving mechanism as claimed in claim 15, wherein the frame further comprises:

a third frame surface facing the movable portion and perpendicular to the optical axis;

a first frame side that extends in the first direction;

a second frame side that extends in a second direction; and a second lightening structure disposed at the second frame side and having a recessed shape, used for reducing the weight of the frame.

17. The optical element driving mechanism as claimed in claim 16, wherein:

the third frame surface at least overlaps a portion of the movable portion when viewed along the optical axis;

the first frame surface and the third frame surface are facing different directions;

the frame has a polygonal shape when viewed along the optical axis;

a width of the first frame side is less than a width of the second frame side;

the first direction and the second direction are not parallel;

the first direction and the second direction are perpendicular to the optical axis.

18. The optical element driving mechanism as claimed in claim 17, wherein the frame further comprises:

a first noise-cancelling surface;

a second noise-cancelling surface that is not parallel to the first noise-cancelling surface;

a first low reflective material disposed on the first noise-cancelling surface; and a second low reflective material disposed on the second noise-cancelling surface.

19. The optical element driving mechanism as claimed in claim 18, wherein:

the first noise-cancelling surface and the second noise-cancelling surface are arranged along the optical axis;

the first noise-cancelling surface is neither parallel nor perpendicular to the optical axis;

the second noise-cancelling surface is neither parallel nor perpendicular to the optical axis;
a roughness of the first noise-cancelling surface is different than a roughness of the third frame surface;
a roughness of the second noise-cancelling surface is different than the roughness of the third frame surface;
the first frame surface and the third frame surface are facing opposite directions.

20. The optical element driving mechanism as claimed in claim 19, wherein:
the roughness of the first noise-cancelling surface is higher than the roughness of the third frame surface;
the roughness of the second noise-cancelling surface is higher than the roughness of the third frame surface;
a reflectivity of the first low reflective material is less than a reflectivity of the third frame surface;
a reflectivity of the second low reflective material is less than the reflectivity of the third frame surface.

* * * * *